United States Patent [19]
Funakoshi et al.

[11] Patent Number: 5,578,200
[45] Date of Patent: Nov. 26, 1996

[54] SEWAGE TREATMENT SYSTEM

[75] Inventors: Yasushi Funakoshi, c/o Bureau of Sewerage, Tokyo Metropolitan Government, 8-1, Nishi-Shinjuku 2-chome, Shinjuku-ku, Tokyo; Khoji Ogata, Nishi-Shinjuku; Masayuki Kojima, Chiyoda-ku; Hitoshi Kawaziri, Chiyoda-ku; Hirofumi Yamamoto, Chiyoda-ku; Kazuhiko Noto, Chiyoda-ku; Naomichi Mori, Chiyoda-ku, all of Japan

[73] Assignees: Hitachi Plant Engineering & Construction Co., Ltd.; Yasushi Funakoshi, both of Tokyo, Japan

[21] Appl. No.: 501,661

[22] Filed: Jul. 12, 1995

Related U.S. Application Data

[62] Division of Ser. No. 263,200, Jun. 21, 1994.

[30] Foreign Application Priority Data

| Jun. 24, 1993 | [JP] | Japan | 5-153590 |
| Apr. 21, 1994 | [JP] | Japan | 6-83472 |
| Apr. 21, 1994 | [JP] | Japan | 6-83473 |

[51] Int. Cl.$^6$ ............... B01D 17/12; B01D 35/05; C02F 3/30
[52] U.S. Cl. ............ 210/134; 210/151; 210/259; 210/266; 210/434; 210/605; 210/631; 210/199
[58] Field of Search ............... 210/87, 96.1, 109, 210/10, 111, 134, 143, 150, 151, 259, 340, 341, 433.1, 434, 605, 614, 618, 631, 199, 202, 97, 198.1, 617, 630, 266

[56] References Cited

U.S. PATENT DOCUMENTS

| 714,709 | 12/1902 | Keane | 210/341 |
| 1,439,406 | 12/1922 | Elrod | 210/605 |
| 2,196,840 | 4/1940 | Singleton | 210/631 |
| 2,360,769 | 10/1941 | Gavett | 210/605 |
| 2,458,163 | 1/1949 | Hays | 210/605 |
| 3,430,934 | 3/1969 | Weishaupt | |
| 4,446,027 | 5/1984 | Simmers | 210/661 |
| 5,006,251 | 4/1991 | Takeishi et al. | 210/631 |
| 5,160,435 | 11/1992 | Albertson | 210/150 |
| 5,248,415 | 9/1993 | Masuda et al. | 210/154 |
| 5,296,147 | 3/1994 | Koster et al. | 210/631 |

FOREIGN PATENT DOCUMENTS

| 0072495 | 2/1983 | European Pat. Off. . |
| 0159008 | 10/1985 | European Pat. Off. . |
| 0301237 | 2/1989 | European Pat. Off. . |
| 0423403 | 4/1991 | European Pat. Off. . |
| 2150760 | 4/1972 | Germany . |
| 51-85257 | 7/1976 | Japan . |
| 60-193508 | 10/1985 | Japan . |
| 1-249113 | 10/1989 | Japan . |
| 2-12405 | 1/1990 | Japan . |
| 91/18658 | 12/1991 | WIPO . |

OTHER PUBLICATIONS

"Micro–Controller System for Water and Sewage Works", Fuji Electric Review, vol. 24, No. 1, 1978, Ito et al.

*Primary Examiner*—Joseph W. Drodge
*Attorney, Agent, or Firm*—Oliff & Berridge

[57] ABSTRACT

A sewage treatment system is provided for cleaning sewage by filtering solid components in the sewage through use of a floating filter medium, wherein the filtration performance can be improved and the filtration cleaning can be performed efficiently. The sewage flows upwardly in the treatment tank and is filtered through the floating filter media layer made of cylindrical mesh floating filter media which have a smaller specific gravity than the sewage. To wash the floating filter medium, air is jetted from the air jetting pipes to generate a circular flow to scape off solid components adhering to the filter medium. Then the waste, which has washed the floating filter medium is discharged to the outside of the treatment tank while the air is jetted from the air jetting pipe for full jetting of the floating filter media layer unidirectionally.

3 Claims, 20 Drawing Sheets

SEWAGE TREATMENT SYSTEM

This application is a division of application No. 08/263,200 filed Jun. 21, 1994.

BACKGROUND OF INVENTION

1. Field of Invention

The invention relates to a sewage treatment system and more particularly to a sewage treatment system characterized by removal of solid components in sewage by high-rate filtration through floating filter media, removal of solid components adhered to the filter, and biological treatment of sewage after the solid components have been removed.

2. Description of the Related Art

Generally, the conventional sewage treatment process cleans the sewage and releases the effluent into public waters such as river and lake by a two part process. The first part includes natural sedimentation of solid components from the sewage in a primary sedimentation tank, and the second part includes biological treatment by microbes in an activated sludge treatment system. Activated sludge that has been treated biologically settles as sediment in a final sedimentation tank. Then the supernatant liquid of the sewage is released and a part of the activated sludge is taken out as surplus sludge. The remaining part of the activated sludge is sent to the activated sludge treatment system. Discharging the effluent only after the sewage has been treated to conform to the water quality standards for public waters, improves the quality of public waters.

However, recently, as urbanization has increased and living standards have risen, the concentration of water contaminants, the amount of sewage, and the number of sources of sewage have increased.

The conventional primary sedimentation tank activated sludge treatment system cannot meet the treatment needs because the solid component removal capacity by natural sedimentation in the primary sedimentation tank lacks sufficient efficiency. Therefore, a filtration system using a high-rate filtration process has been developed to remove solid components quickly. According to the high-rate filtration system, a layer of floating filter media, that is made of granular filter media having a specific gravity smaller than that of the sewage, is provided for filtering the sewage. When the filtering performance declines by solid components in the sewage saturating the filter medium, the filter is cleaned to reactivate the filtering capability. Therefore, the filtration rate is higher than that of the primary sedimentation tank. Such high-rate filtration systems are disclosed in Japanese Patent Application Laid-open No. 51-85257, Japanese Patent Application Laid-open No. 60-193508, and Japanese Utility Model Application Laid-open No. 2-12405.

The conventional filtration system using a high-rate filtration process has a higher filtration rate than the primary sedimentation tank, and therefore a smaller area is required for the treatment system. However, the filter medium may become blocked quickly, shortening the break through point, thereby losing filtration performance. Therefore, the filter medium must be cleaned frequently. Further, another disadvantage is that large effluent volumes of filter backwash water are generated. A further disadvantage is that the flow resistance reduces the filtration rate.

In a conventional combined sewage treatment system, when an extraordinary amount of rain water delivers an amount of sewage inflow beyond the capacity of the activated sludge treatment system, the excess sewage must be released to public waters merely after removing the solid component. Therefore, the solid components in the sewage must be removed to the greatest extent possible before that release. However, in the conventional sewage treatment system, the sewage is released into public waters without sufficient solid component removal.

Because conventional systems lack sufficient capacity for peak inflow, the quality of public waters deteriorates. The conventional system lacks technology for handling sudden increases of inflow.

Under these circumstances, it is desirable to develop a sewage treatment system that:

(1) provides efficient filtration of solid components in sewage, provides efficient cleaning of filter medium for reuse, and is compact; and (2) provides high-rate filtration and biological treatment with adequate capacity for peak inflow of sewage.

SUMMARY OF THE INVENTION

This invention has been developed to eliminate these disadvantages and includes an objective to provide a sewage treatment system wherein solid components in sewage can be filtered efficiently, wherein the filter medium can be cleaned efficiently to recycle the filter medium, and wherein the system can be made compact.

Moreover, this invention has been developed to eliminate disadvantages and includes as an objective provision of a sewage treatment system, wherein a filtering system having a high-rate filtration process and a biological treatment system are combined, and the water quality of the treated water can be improved in accordance with the inflow volume and the nature of the sewage.

To achieve the above objectives, a sewage treatment system for filtering solid components in sewage and cleaning the sewage, the sewage treatment system comprising: a floating filter media layer, which is provided in a treatment tank for filtering the solid components in the sewage which flows upward in the treatment tank by a layer which is formed with numerous floating filter media that have smaller specific gravity than that of the sewage; and, a jetting means provided at the lower position of the floating filter media layer, for washing the floating filter media by generating a circular flow of the sewage in the treatment tank, and for discharging the sewage that has been washed from the floating filter media by jetting air to the floating filter media layer en masse.

To achieve the above objectives, a sewage treatment system for filtering solid components in sewage, and cleaning the sewage, the sewage treatment system comprises: a filtration chamber, containing a floating filter media layer composed of numerous filters which have smaller specific gravity than that of the sewage for filtering upward flow of inflow sewage, and an air jetting means fixed at the lower position of the floating filter media layer for generating a circular flow of the sewage in the treatment tank to wash the floating filter medium, and for jetting air to the floating filter media layer to discharge the sewage that has been washed by the filter medium; a sedimentation chamber located under the filtration chamber through a partition plate for storing the sewage which has been washed by the floating filter media and which has been jetted from the filtration chamber, and for discharging the sewage which are separated into sludge and supernatant liquid after the sedimentation of the solid components in the sewage; and, a partition plate for separating the filtration chamber and the sedimentation chamber.

To achieve the above objectives, a sewage treatment system for applying filtration treatment and biological treatment to sewage, and cleaning the sewage, the sewage treatment system comprises: a filtration device for filtering the sewage, which is flowed into the filtration tank in a upward-flow, with a floating filter medium layer formed with numerous floating filter media that have a smaller specific gravity than that of the sewage; a biological treatment device for biologically treating by contacting filtered water which is filtered through the filtration device with microbes; a bypass line for sewage flowing directly into an entrance of the biological treatment plant bypassing the filtration plant; and, a releasing line for directly releasing the filtered water, which is filtered by the filtration plant, to public waters without passing through the biological treatment device.

According to a first aspect of the invention, the sewage, which flows into the treatment tank in the upward-flow, is filtered by the floating filter medium layer formed with the floating filter media. When the filtering performance declines because solid components adhere to the filter media, air is jetted from the air jetting means, which is located under the floating filter medium layer, to generate a circular flow in the sewage. The floating filter media are circulated with the circular flow. Therefore, the solid components adhering to the floating filter medium can be scraped off effectively by the friction between the filter media and the shearing power of air or the like. Then, the sewage, which has been washed by the floating filter medium, is discharged to the outside of the tank, while air is jetted from the air jetting means to the floating filter layer en masse. With this arrangement, the solid components, which have been scraped off in to the sewage, can be discharged without re-adhering to the filter medium. The floating filter media is formed with open upper and lower ends and mesh sides in the form of a cylinder with a void ratio of more than 80%. Therefore, the sewage can be processed through it easily and the maximum filtration rate can be increased to 1,000 m/day. The removal rate of the solid components can be improved and the filtration performance can be maintained. Further, when the projections are formed on the inside of the floating filter media, filtration performance can be further improved. The wire forming the mesh of the floating filter media has a diameter from 1 to 5 mm, preferably from 2 to 4 mm.

According to a second aspect of the invention, the sewage, which flows into the filtration chamber upwardly, is filtered by the floating filter medium layer formed with the floating filtration media, and the floating filtration media are cleaned by jetting air from the air jetting means when the filtration performance of the floating filtration media declines. And, in the second aspect, particularly, a sedimentation chamber is provided under a filtration chamber, and the sedimentation chamber and the filtration chamber are separated by a partition plate. With this arrangement, the filtering and cleaning process of filter media in the filtration chamber, and the storage of the sewage, which is discharged from the filtration chamber and washed by the filter medium, and the sedimentation and removal process of solid components in the sewage can be performed simultaneously. Therefore, the filtering process can be performed continuously except for the filter media cleaning process. Therefore, the filtering efficiency can be improved and the system can be made compact. The filter cleaning water is separated into supernatant liquid and sludge in the sedimentation chamber. Therefore, clean filtered water can be dumped easily and the sludge volume can be decreased.

According to a third aspect of the invention, the filtering system and the biological treatment system are coordinated systematically so that solid components in the sewage can be removed at a high filtration rate. Therefore, the load in the biological treatment system can be reduced, and the filtering performance can be improved. Particularly, in the filtering system, the floating filter medium layer is formed by the filter media, as in the first aspect so that the filtering performance can be remarkably improved. The sewage can be sent directly to the biological treatment system through the bypass line. Therefore, sufficient organic concentration for biological treatment can be maintained and the sewage with few solid components can be delivered directly to the biological treatment process. Also, a part of the filtered water, which is filtered with the filtering system, can be discharged to public waters through a releasing line without passing through the biological treatment system. Thus, the system can easily cope with the volume and the nature of the inflowing sewage. Particularly, in a combined sewage treatment system, the temporary increase of the water which is caused by rain can be adequately handled.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Figure 1:
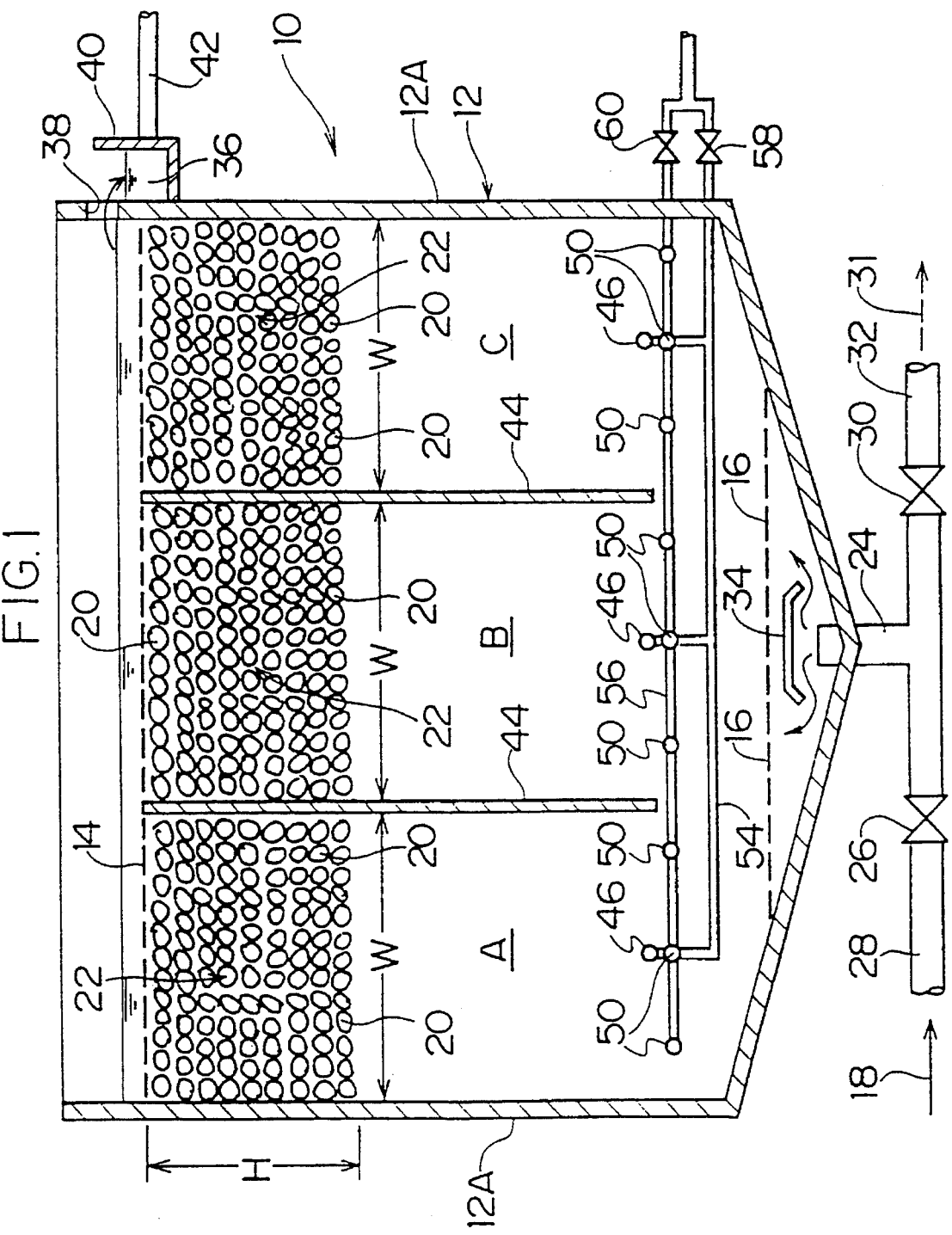
FIG. 1 is a longitudinal sectional view of a first embodiment of the sewage treatment system according to the invention.
Figure 2:
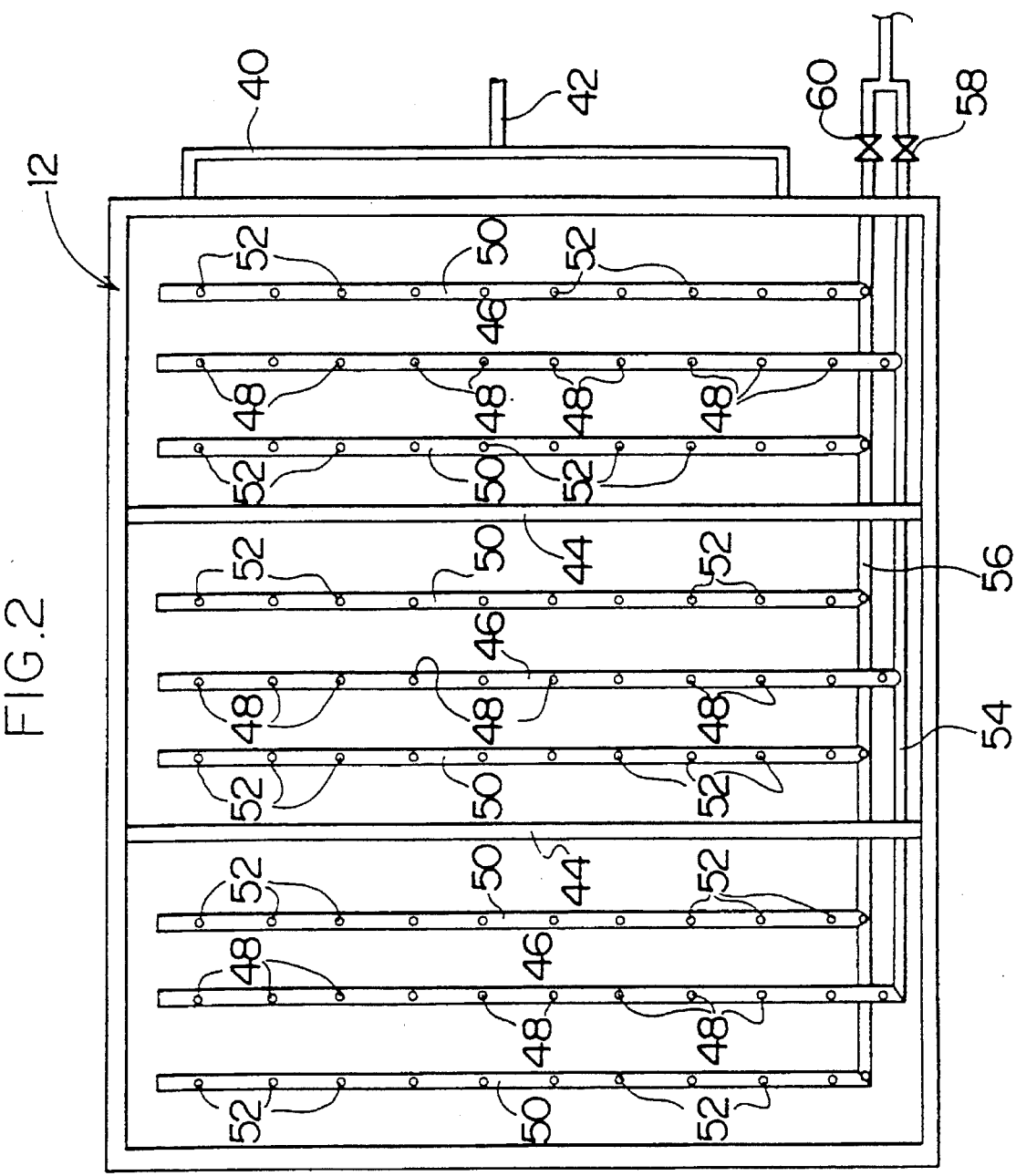
FIG. 2 is a plan view shown from the top of FIG. 1.

FIG. 1 is the longitudinal sectional view of a sewage treatment system according to a first embodiment invention. FIG. 2 is the plan view shown from the top of FIG. 1 without the floating filter media layer 22.

Figure 3:
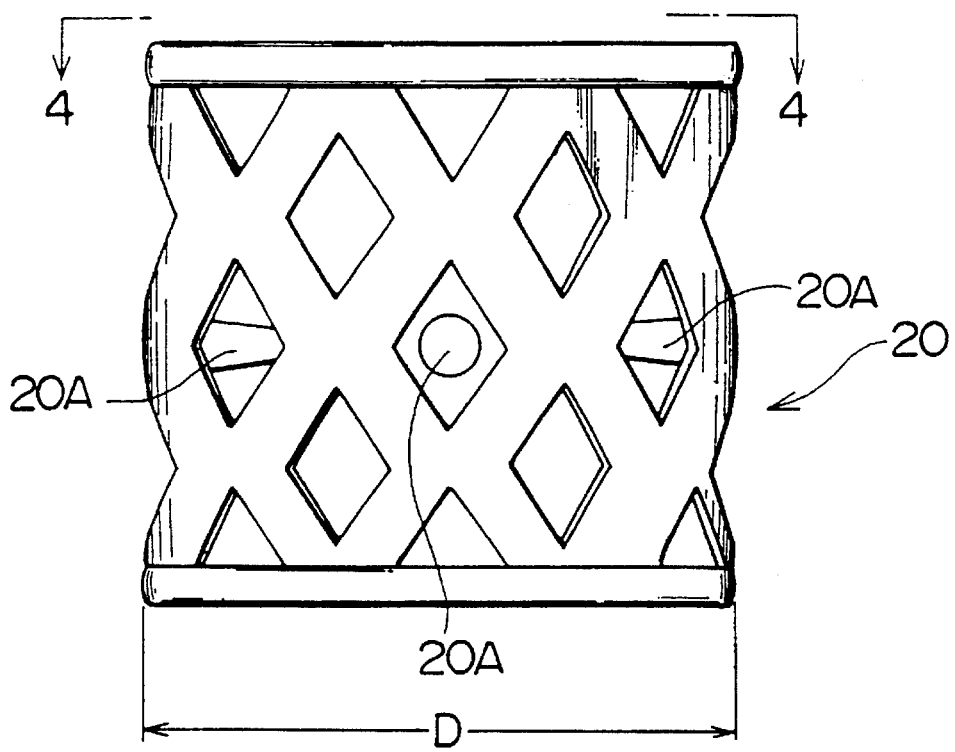
FIG. 3 is a side view showing a form of a floating filter media used in the sewage treatment system according this invention.
Figure 4:
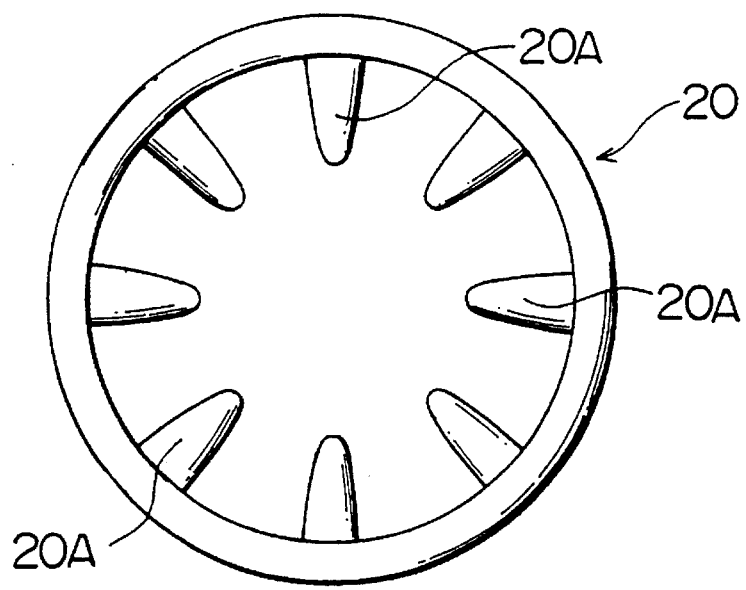
FIG. 4 is a view shown from the direction of the line 4—4 in FIG. 3.
Figure 5:
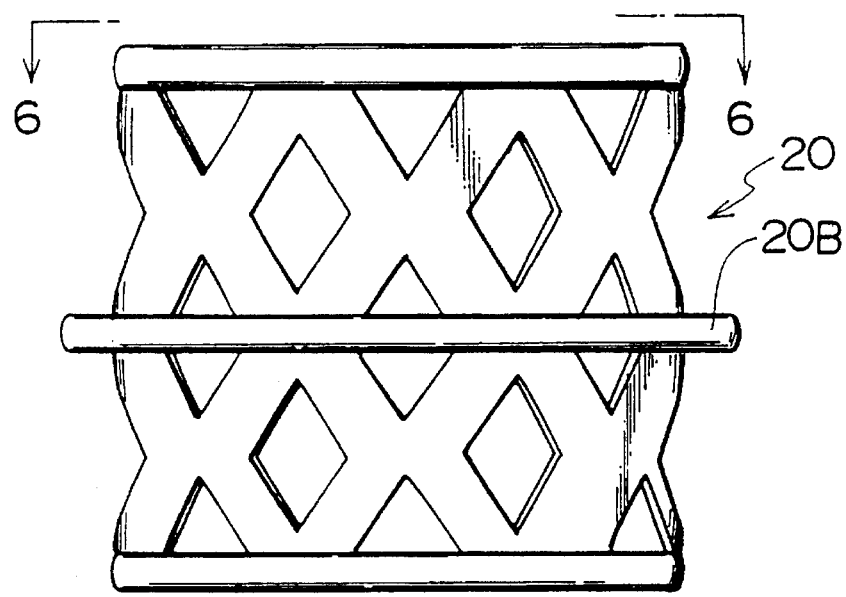
FIG. 5 is a side view showing another form of a floating filter media.
Figure 6:
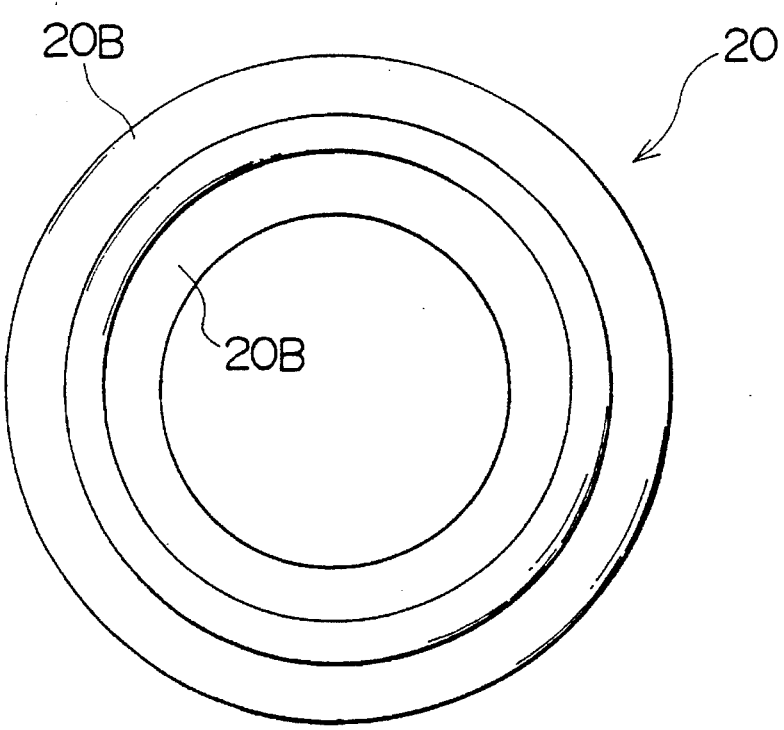
FIG. 6 is a view shown from the direction of the line 6—6 in FIG. 5.

As shown in FIGS. 1 and 2, the upper part of a treatment tank 12 is formed in a square and the bottom thereof in a pyramid. An upper mesh screen 14 and a lower mesh screen 16 are located across the upper and lower parts of the treatment tank 12. Numerous filter media 20, which have structures described later, float in the sewage 18 and form a floating filter medium layer 22 under the upper screen 14. The preferred height of the floating filter medium layer 22 is about 2 m±50 cm, and the preferred ratio of the layer height of the floating filter medium layer 22 to the height of the treatment tank 12 is 0.5 or less. And, as shown in FIGS. 3 and 5, the filter media 20, which form the floating filter medium layer 22, are formed as cylinder shaped meshes with open ends, and with projections 20A and 20B. The filter media 20 are lighter than the sewage. In one embodiment, the filter media 20 are made of polypropylene which has anti-corrosive properties and the average diameter (D) of the cylinders is about 20 mm. The mesh is made of propylene wires of which the thickness is from 1 to 5 mm, preferably from 2 to 4 mm. The specific gravity of the filter media 20 is about 0.9, the void ratio about 90%, and the surface ratio about 300 $m^2$/filter media $m^3$. The floating filter media layer 22 provided with the filter media 20, provides filtering across the entire layer with a minimum filter resistance. Thus, high-speed filtration treatment can be performed at a maximum filtration speed 1,000 m/day with long continuous filtration. The projections 20A and 20B are formed as spikes (see FIG. 4) or in a sword guard shape (see FIG. 6) in accordance with the shapes of the solid components in the sewage 18.

An opening of a pipe 24 is situated at the bottom of the treatment tank 12, and the pipe 24 extends to the outside of the treatment tank 12 and divides into two branches. One branch is connected with a raw water pipe 28 via a raw water valve 26. The other branch is connected with a discharge pipe 32 which discharges washing waste water 31, containing rinsed solid component obtained by washing floating filter medium 20, via a discharge valve 30. A dispersion plate 34, disperses the sewage 18 that flows into the treatment tank 12 to the treatment tank 12 as a whole, and is placed over the opening of the pipe 24. Thus, the sewage 18, input to the bottom of the treatment tank 12 through the raw water pipe 28 and the pipe 24, is dispersed by the dispersion plate 34, and flows upwardly in the treatment tank 12. At the upper part of the treatment tank 12, an overflow exit 38 passes the filtered water 36, which is filtered and cleansed by the floating filter medium layer 22, into a trough 40 for transfer into the next treatment process or the like via the treatment pipe 42.

In the treatment tank 12, a partition 44 is vertically is placed about from the upper screen 14 to the lower screen 16 in a manner that the width(W)/height(H) ratio of the floating filter media layer 22 is between 0.3 and 1.6. Areas A, B and C separated by partition 44 are connected at the upper and lower ends of the partition 44. Under the floating filter media layer 22 and at almost the centers of the respective areas A, B and C, air pipes 46 for creating circular flows are installed in parallel with the partition 44, and include numerous air jet nozzles 48 (refer to FIG. 2) that can be opened to create circular flow. Air pipes 50 for jetting air en masse are installed in parallel with the air pipe 46 for circular flows, and numerous air jet nozzles 52 (refer to FIG. 2) are opened on the air pipe 50 for jetting en masse. The air pipe 46 for circular flows and the air pipe 50 for jetting air for unidirectional flow are connected to a compressor, not shown, through the respective air supply pipes 54 and 56, and an air valve 58 for jetting for circular flows and an air valve 60 for jetting for full jetting are provided in the respective air supply pipe 54, 56 to be switched respectively.

Next, a description will be given of the operation of the sewage treatment system 10 according to the first embodiment.

First, the filtration process is described. The raw water valve 26 is opened while the discharge valve 30 is closed. The sewage 18, which flows into the bottom of the treatment tank 12 through the raw water pipe 28 and the pipe 24, is dispersed by the dispersion plate 34. Large impurities are removed by the lower screen 16 as the sewage flows upward in the treatment tank 12. The sewage 18 which flows up in the treatment tank 12 is filtered by the floating filter media layer 22, and then passes through the upper screen 14 and overflows from the overflow exit 38 to the trough 40 as filtered water 36. The solid components in the sewage 18 are captured by the filter medium 20 while passing through the floating filter media layer 22.

Figure 7:
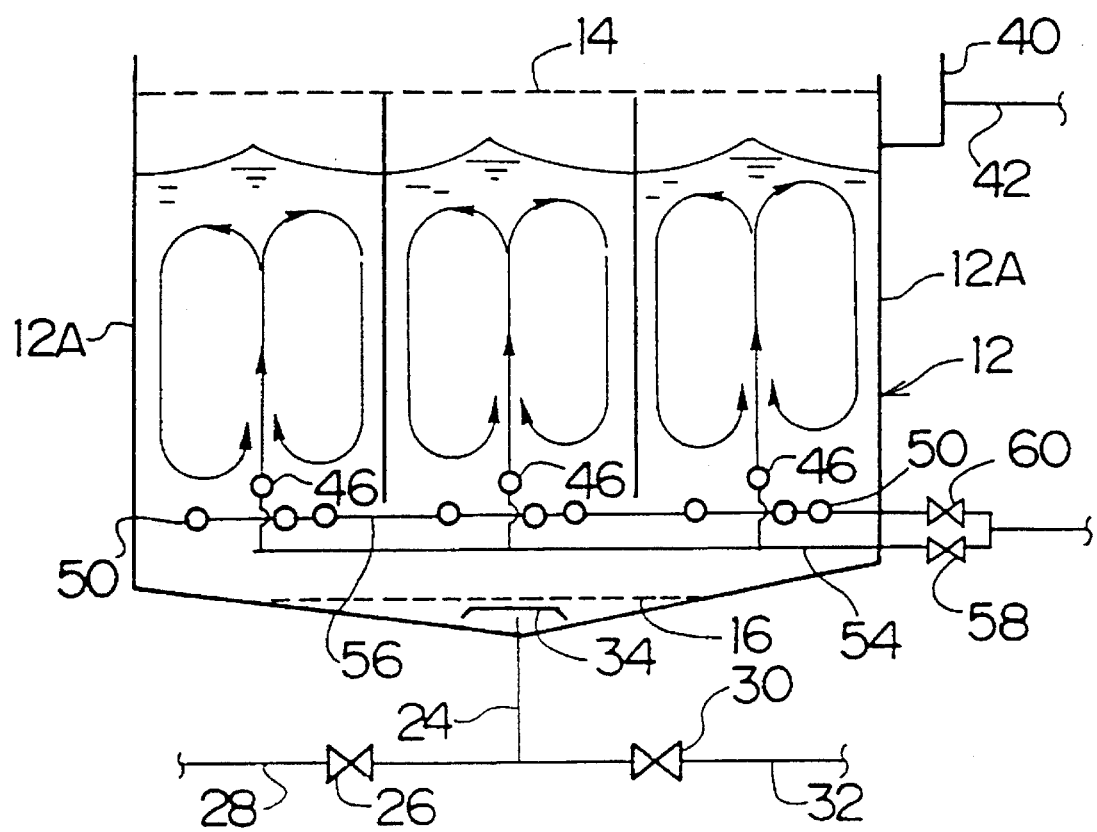
FIG. 7 is a diagram illustrating a state in which filter media are circulated by air while washing the filter medium according to the first embodiment.

Next, a description will be given of the filter media washing process when the filtering capacity of the filter medium 20 decreases due solid components in sewage 18 adhering to the filter medium 20 during filtration. First, the raw water valve 26 is closed to stop the flow of the sewage 18 into the treatment tank 12. Next, the discharge valve 30 is opened to lower the water level of the treatment tank 12 below the upper screen 14. When the water level of the treatment tank is lowered, the discharge valve 30 is closed. The reason that the water level in the treatment tank 12 is lowered is to prevent solid components, which are scaled off from the filter medium 20 when they are washed, from overflowing with the filtered water 36 into the trough 40. Then, the air valve 58 for circular flows is opened to jet air from the air pipe 46 for circular flows to the floating filter medium layer 22. The jetted air generates upward-flow of the sewage 18 at the center of the areas A, B and C, as shown in FIG. 7. The upward flow turns left or right at the water surface, and hits the walls 12A of the treatment tank 12 or the partition 44 and falls downward to form circular flows in the respective areas A, B and C. The filter medium 20 of the floating filter medium layer 22 moves with the circular flows. The filter medium 20 is moved by the circular flows, whereby a shearing power is generated at the interface of the filter medium 20 which moves upward in the center of the respective areas A, B and C and the filter medium 20 which moves downward along the walls 12A of the treatment tank 12 or the partition 44. The solid components adhered to filters 20 are rubbed and scaled off by this shearing force. The contact resistance of the filter media 20, increases as the media 20 move downward closer to the walls 12A of the treatment tank 12 or the partition 44. Therefore, the moving speed becomes lower closer to the walls 12A of the treatment tank 12 or the partition 44. Therefore, a shearing force occurs by the moving speed lag of the filter medium 20, so that the solid components adhering to the filter medium 20 can be scraped off easily. Furthermore, the solid components captured by the interior, the mesh, or the projections of the filter medium 20 are scaled off by the air bubbles which jet upward violently in the centers of area A, B and C. The solid components adhering to the filter medium 20 are scaled off by the shearing force of the circular flow.

Continued circling of the filter medium 20 exposes the filter medium 20 to the shearing force throughout. The time required to wash away solid components from the filter medium 20 depends upon the speed of the circular flow and the circling frequency of the filter medium 20. Ordinarily about 3 to 7 minutes will be appropriate. The first embodiment shows that in the case such that the width/height ratio of floating filter media layer 22 is large, the treatment tank 12 is divided into several compartments such as areas A, B and C, so that the circular flows are generated in the respective areas A, B and C, and in the treatment tank 12 as a whole.

Figure 8:
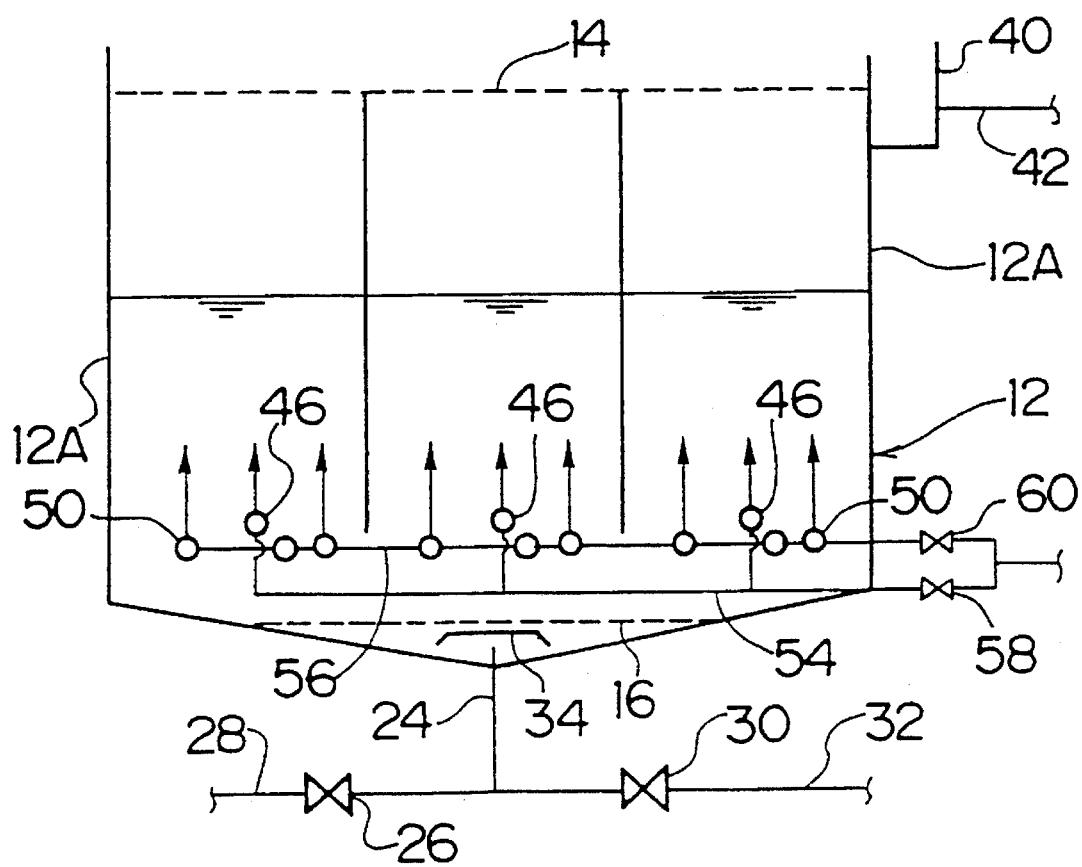
FIG. 8 is a diagram illustrating a state in which air is jetted to filter medium en masse and washing water is discharged out of the tank while washing the filter medium according to the first embodiment.

Next, after scaling off the solid components by circular motion of the filter medium 20, as shown in FIG. 8, the air valve 58 for circular flow is closed, and while the air valve 60 for jetting for unidirectional flow is opened to jet air to the floating filter medium layer 22 en masse the discharge valve 30 is opened to discharge the washing waste water 31 with a high solid component concentration into the discharge pipe 32.

Thus, the sewage treatment system 10 according to the first embodiment of the invention can improve the filtration capacity since the sewage which is moved upward into the treatment tank 12 is filtered by the floating filter media layer 22 which consists of the cylindrical mesh filter medium 20 of the above described structure. In washing the filter medium 20, the circular flows are generated in the sewage 18 in the treatment tank 12 by jetting air from the air pipe 46 for the circular flow to circulate the filter medium 20 and improve the washing performance. The partition 44 is installed vertically to maintain a fixed width/height ratio of floating filters medium 22 and the circular flows are generated in the respective areas A, B and C, so that even when the width/height ratio of floating filter medium 22 is large, the filter media 20 can be washed effectively in a short time. Once solid components are scraped off from the filter media 20 by the circular flows, the sewage is discharged to the outside of the treatment tank 12 while the floating filter medium layer 22 is jetted unidirectionally, so that solid components do not re-adhere to filter media 20 to obtain complete washing of the filter media 20.

Figure 9:
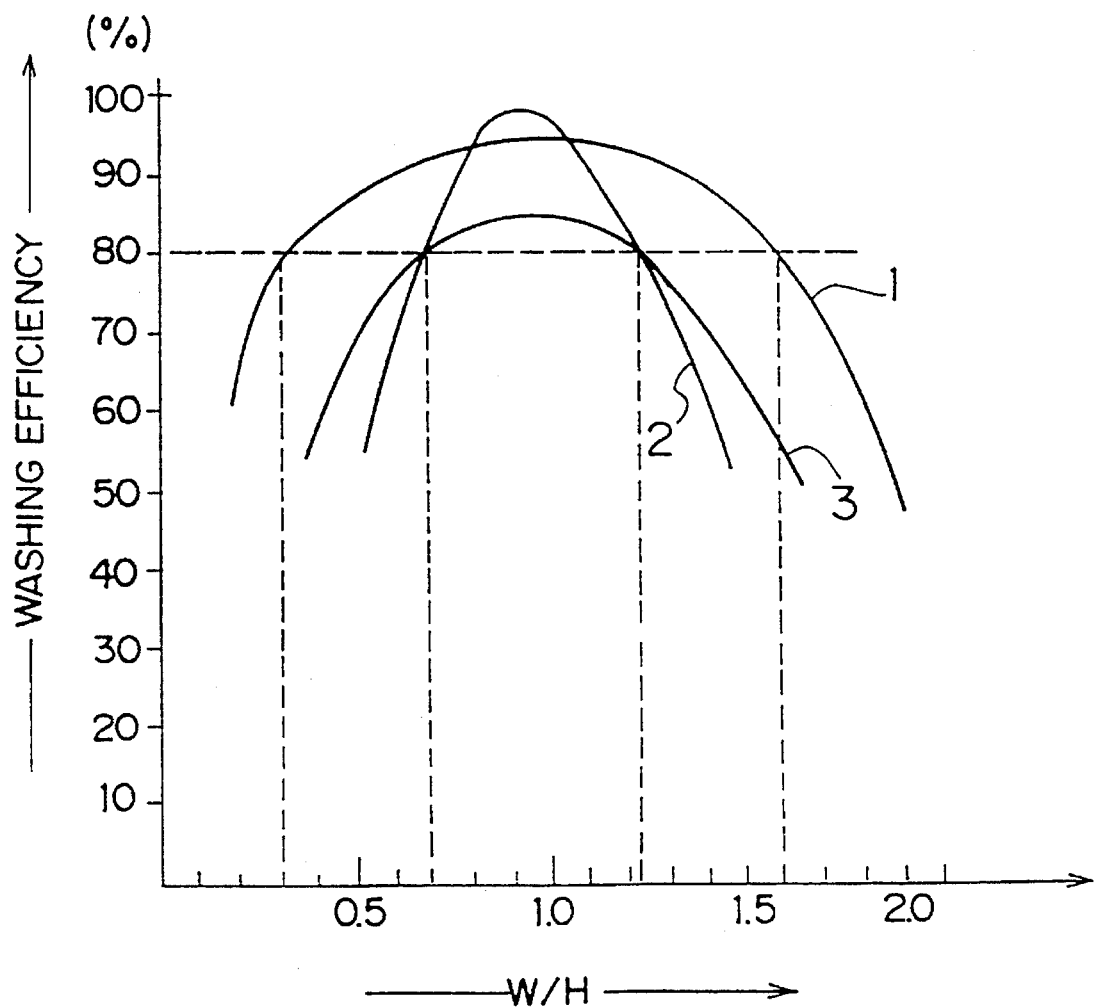
FIG. 9 is a graph of the relation between Height and Width ratio (H/W) of the floating filter media layer and cleaning ratio of the filter medium.

The washing performance can be remarkably improved by installing the partition 44 to obtain a width/height ratio of in the range of floating filter medium layer 22 of 0.3 to 1.6. FIG. 9 shows the correlation between the width (W)/height (H) ratio of floating filter medium 22 and the washing rate(%) of the filter media 20. The curve 1 shows the result when the air volume jetted from the air pipe 46 for circular flow is 35 $Nm^3$/filter medium $m^3$· hour. As shown in FIG. 9, a high washing performance of 80% or more is exhibited at a W/H ratio from 0.3 to 1.6. Curve 2 shows the result when the air volume is 25 $Nm^3$/filter medium $M^3$·hour, and the curve 3 shows the result when air volume is 50 $Nm^3$/filter medium $m^3$·hour. These results show that when the partition 44 is set to fix W/H ratio from 0.7 to 1.2, though the ratio changes in accordance with the air volume, the washing rate of 80% or more can be obtained in spite of a little variation in the air volume.

Figure 10:
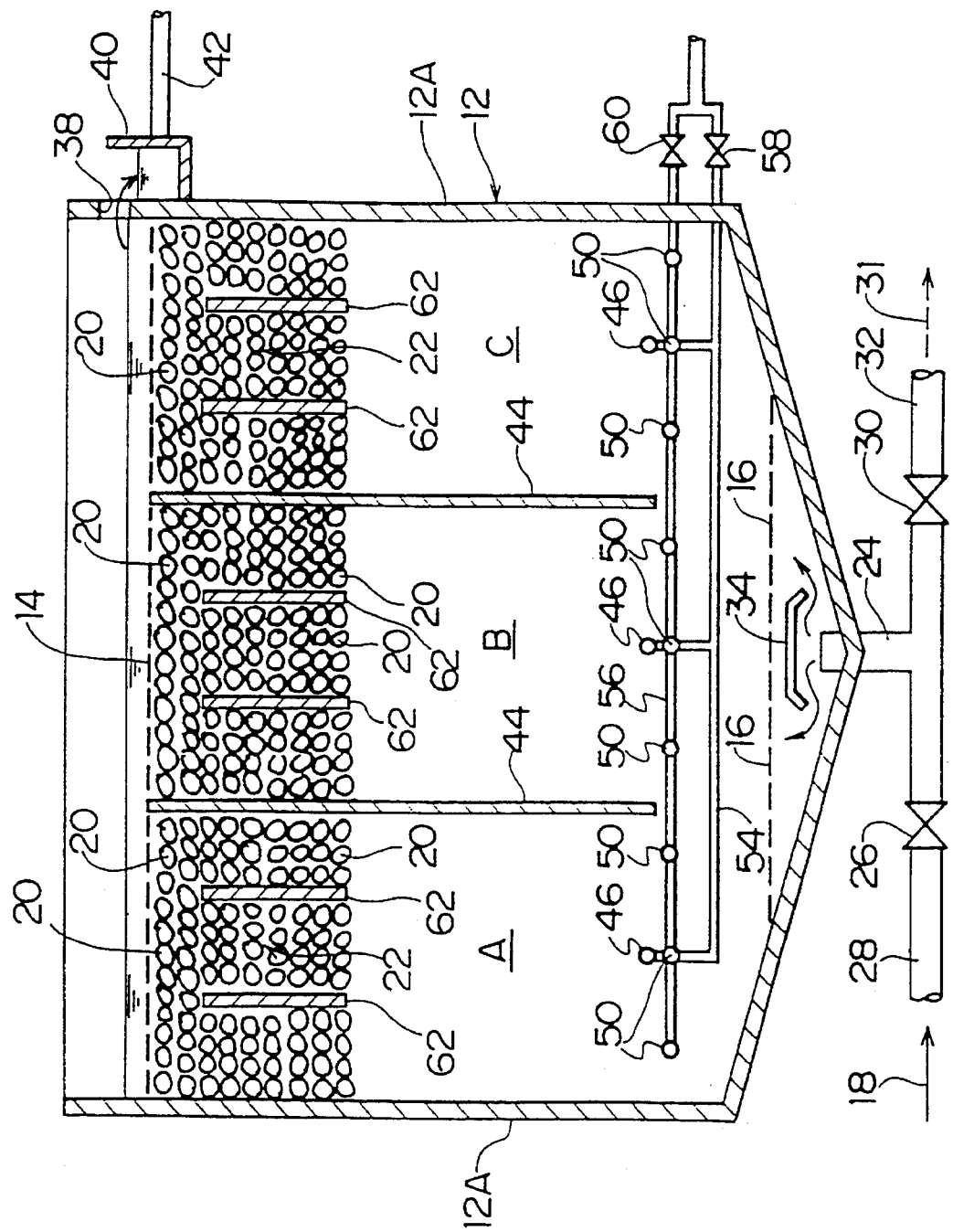
FIG. 10 is a longitudinal sectional view of a second embodiment of the sewage treatment system according to the invention.
Figure 11:
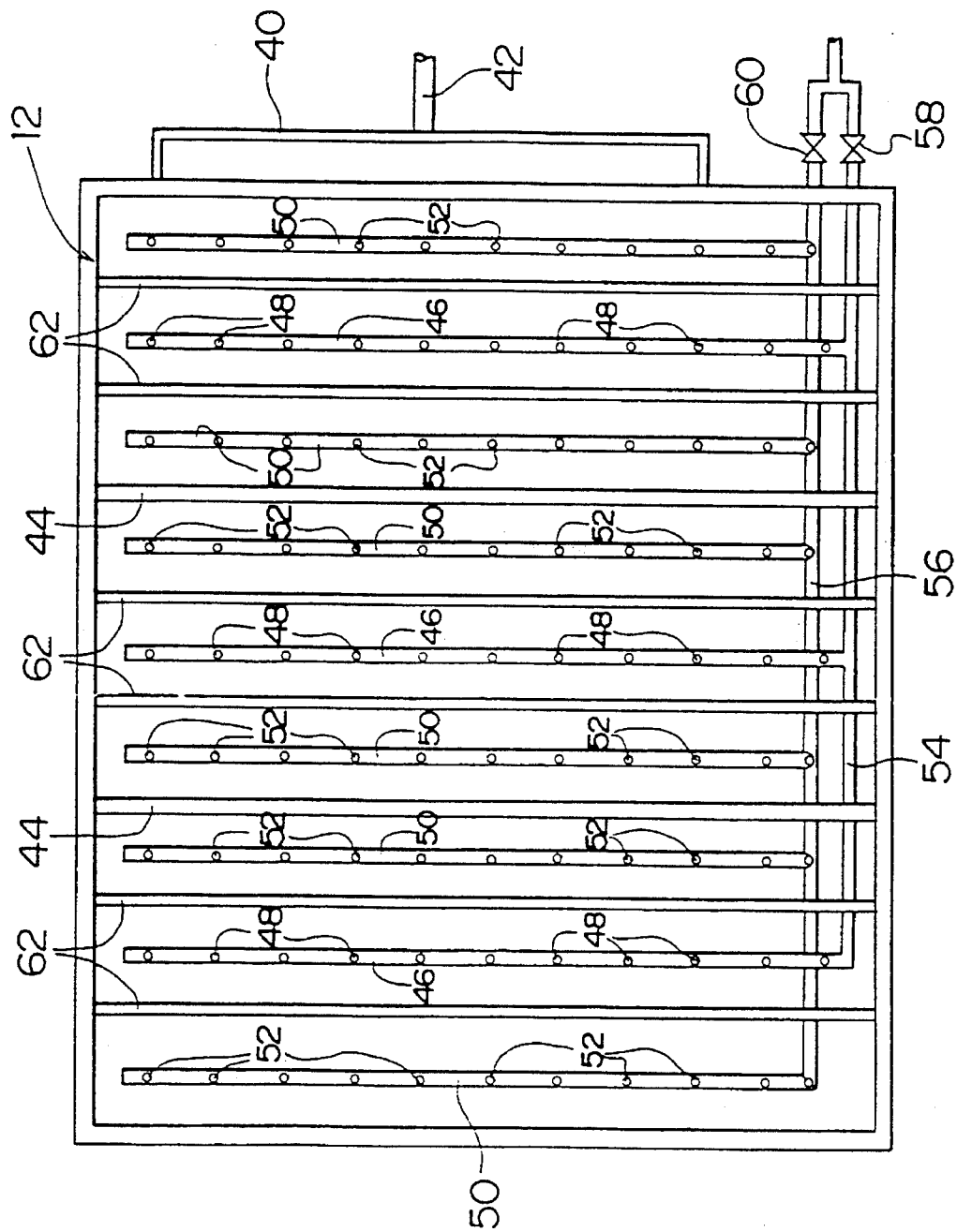
FIG. 11 is a plan view shown from the top of FIG. 10.

Next, a description will be given of the sewage treatment system according to the second embodiment of the invention with reference to FIGS. 10 and 11. FIG. 10 is a longitudinal sectional view of the sewage treatment system according to the second embodiment of the invention, and FIG. 11 is the plan view from the top of FIG. 10 without the floating filter media layer 22. Parts and apparatus common to the first embodiment are referenced with the same reference numeral. In the second embodiment, a pair of guide plates 62 are placed vertically over and along the air pipe 46 for circular flows to form guide passages. With this arrangement, the filter medium 20 which moves upward and the filter medium 20 which moves downward do not come in contact, whereby the flow resistance can be reduced. Therefore, the circular flows can be generated with little air flow, so that the power for generating air can be reduced to reduce operating costs.

Although the shearing power generated between the filter media 20 which move upward and the filter media 20 which move downward is lost in this case, a new shearing power is produced between guide plate 62 and the filter medium 20, so that the same washing performance as the first embodiment can be obtained.

The partition 44 in the treatment tank 12 may be porous such as a punched plate. In this case, the sewage passes through the pores to equalize the pressure in the areas A, B and C, so that air can be easily and equally jetted into areas A, B and C. In FIGS. 10 and 11 the guide plate 62 is installed in parallel along the air pipe 46 for circular flow and the air pipe 50 for unidirectional jetting. Further, another guide plate (not shown) crossing the guide plate 62 at a right angle may be installed to make a cross stripe. With such an arrangement, the deviation and piling of the filter media 20 caused by the deviation of the air jetting volume (generally, the air jetting pressure is lower as the distance from the air ejection source gets longer) can be provided for.

Next, the description will be given of the sewage treatment system according to the third embodiment of the invention with reference to FIG. 12.

Figure 12:
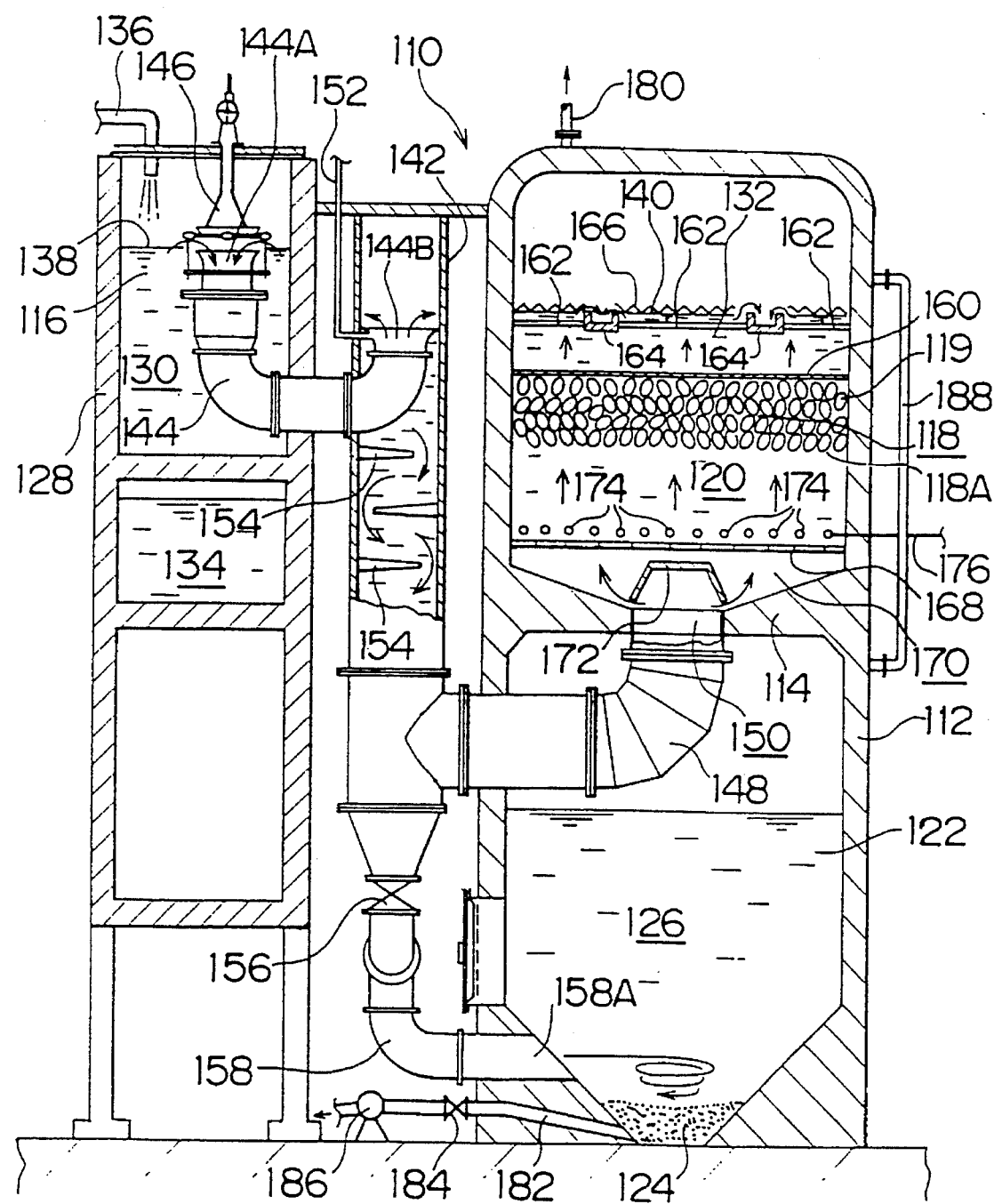
FIG. 12 is a longitudinal sectional view of a third embodiment of the sewage treatment system according to this invention.

As shown in FIG. 12, a cylindrical treatment tank 112 is divided into the upper chamber and lower chamber by a horizontal partitive plate 114 located at almost the middle of the tank 112. The upper chamber serves as a filtration chamber 120 with floating filter medium layer 118 to filter the sewage 116. The lower chamber serves as a sedimentation chamber 126 for solid components 124 in the washing waste water 122 used for washing the filter medium 119 which form the floating filter media layer 118. The filter medium 119 used here is the same as the filter medium of the first embodiment.

A storage tank 128 is provided beside the treatment tank 112. The storage tank is divided into the upper chamber which serves as a raw water storage tank 130 to store sewage 116 and the lower chamber which serves as a treated water storage tank 134 to store the water 132 filtered by the floating filter media layer 118. The sewage 116 is fed into a raw water storage tank 130 through a raw water supply pipe 136. The water level 138 in the raw water storage tank 130 is maintained at a constant level higher than the water level 140 in the filtration tank 120. A flocculating pipe 142 is located between the treatment tank 112 and the storage tank 128, and a U-shaped raw water receiving pipe 144 passes through the lower side wall of the raw water storage tank 130 and the upper side wall of the flocculating pipe 142. One end of the raw water receiving pipe 144 opens upward under the water level 138 of the raw water storage tank 130 as an intake opening 144A of the sewage 116. The other end is opened upward at the upper part in the flocculating pipe 142 as a supply opening 144B for the sewage 116. The intake opening 144A of the raw water receiving pipe 144 is positioned higher than the supply opening 144B. With this arrangement, the sewage 116 in the raw water tank 130 flows into the raw water receiving pipe 144 from the taking opening 144A, and then overflows from the supply opening 144B into the upper part of the flocculating pipe 142. The volume or the complete stopping of intake of sewage 116 from the supply opening 144 is controlled by an electric telescope valve 146. One end of a water transfer pipe 148 is connected to the flocculating pipe 142 in the vicinity of the lower part, and the other end is connected to the opening 150 near the center of the partitive plate 114 and passes through the upper side wall of the sedimentation tank 126. At the upper position of flocculating pipe 142, a coagulation pipe 152 is placed, and plural baffling plates 154 are located horizontally in the flocculating tank 142. Coagulant is added to the sewage 116 from the coagulation pipe 152 before the sewage 116 circulates past the baffling plate 154 while flowing down the flocculating pipe 142 to thereby flocculate. The lower end of the flocculation pipe 142 is linked with the lower part of the sedimentation tank 126 through the washing waste water pipe 158 via the washing waste water valve 156.

Next, a description will be given of the structure in the filtration chamber 120 in the treatment tank 112. A grating plate 160, which is formed by a fine grate, is located horizontally in the upper part of the filtration tank 120. Under the grating plate 160, numerous filter media 119 are floated and fixed in sewage 116 to form the floating filter medium layer 118. The height of the floating filter media layer 118, and the ratio of the filter tank 120 height/floating filter media 118 height is the same as the first embodiment. In the upper part of the grating plate 160, a trough 164 is located by an arm 162 which is supported by the internal wall of the filter tank 120. The filtered water 132 filtered by the floating filter medium layer 118 overflows into trough 164. The filtered water 132 that overflows into the trough 164 is sent to the treated water storage tank 134 of the storage tank 128 through a treated water pipe (not shown). On the surface 140 of the treated water 132, a wavy wear plate 166 is arranged. In the vicinity of the baffling plate 114 and under the floating filter media layer 118, a straightening plate 168 of coarse grating structure is installed across the filtration tank 120 and a dispersion area 170 is arranged between the straightening plate 168 and the baffling plate 114. A distribution plate 172 is placed near the opening 150 of the baffling plate 114.

Figure 13:
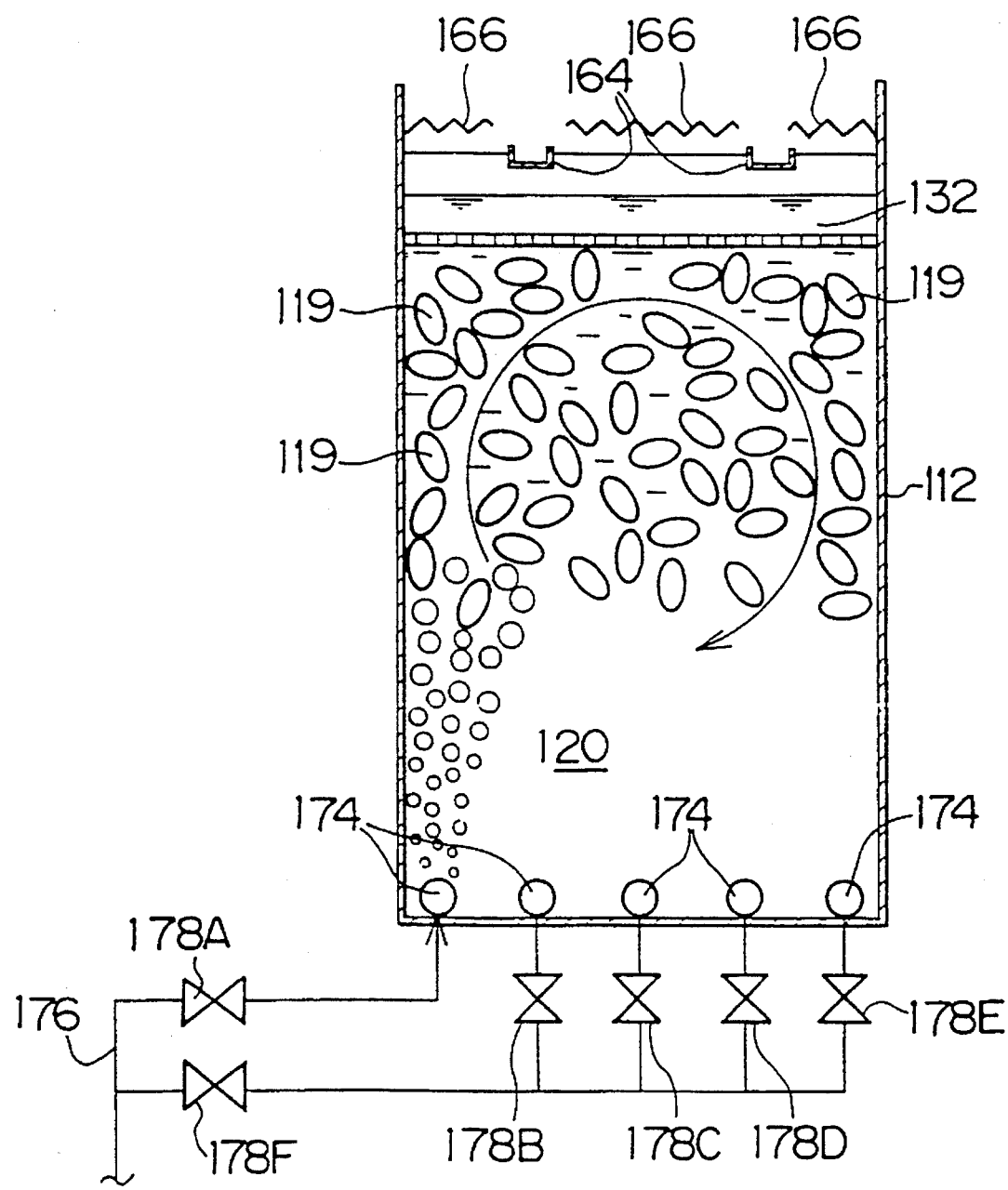
FIG. 13 is a diagram illustrating a state in which filter media are circulated by air while washing the filter medium according to the third embodiment.
Figure 14:
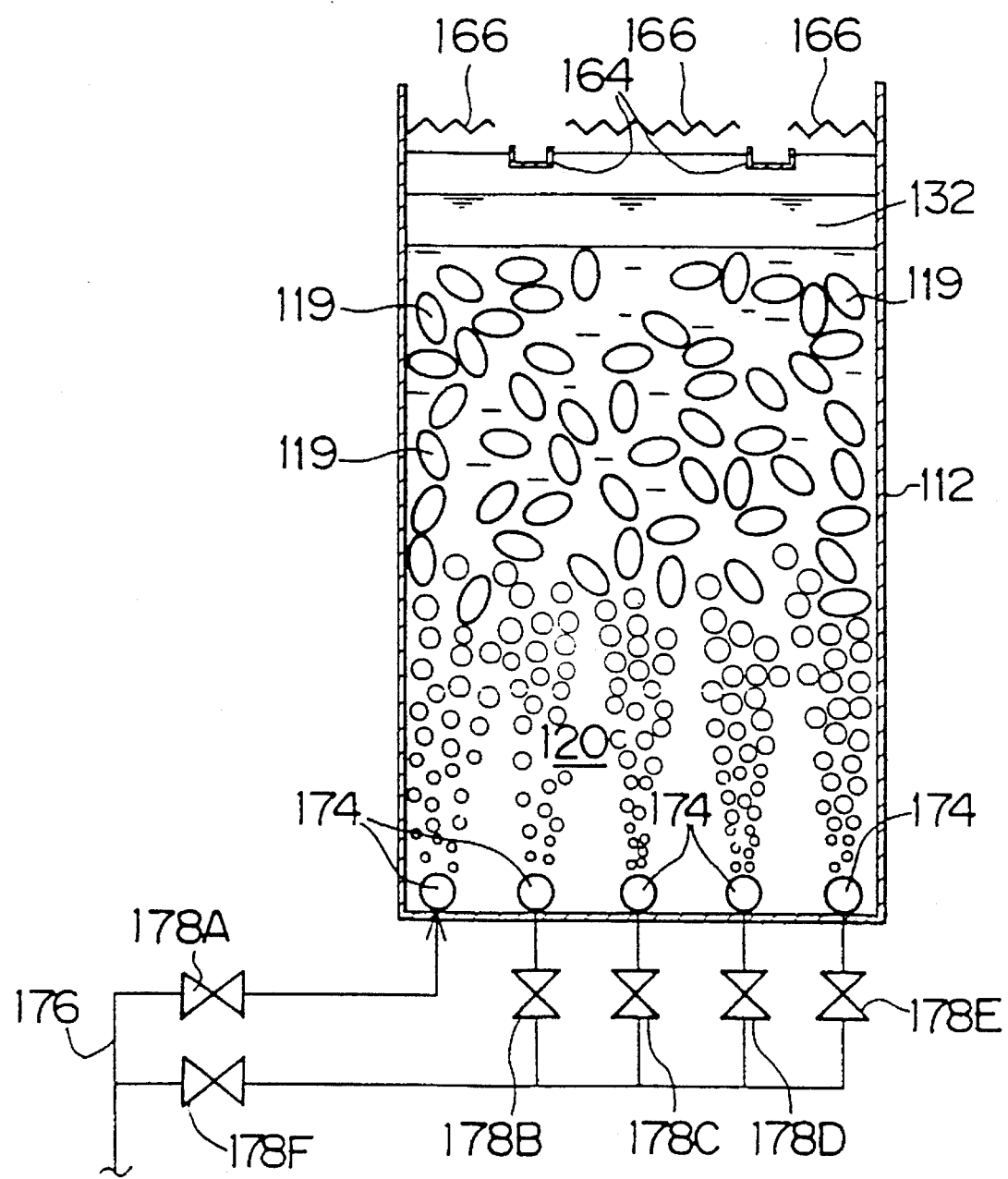
FIG. 14 is a diagram illustrating a state in which air is jetted to filter medium unidirectionally while washing the filter medium according to the third embodiment.

An air pipe 176 has numerous air nozzles 174 which jet air toward the floating filter medium layer 118. The air pipe 176 is placed over the straightening plate 168 and is connected to a compressor (not shown). As shown in FIGS. 13 and 14, air nozzle valves 178A, 178B, 178C, 178D, 178E and 178F are provided with the air pipe 176, and air nozzles 178B, 178C, 178D and 178E are set normally open. When only the air nozzle 178A is opened to jet air, for example, a circular flow can be generated to the sewage in the filtration tank 120 as shown in FIG. 13. And, when the air nozzle 178A is closed and the air nozzle 178F is opened, the floating filter media layer 118 in the filtration tank 120 can be jetted unidirectionally as shown in FIG. 14.

At the ceiling of the filtration tank 120 an exhaust pipe 180 is provided for air emission. The air is jetted from the air nozzle 174 to generate circular flows in the sewage 116 and jetted to the floating filter media layer 118 en masse and then is emitted through the exhaust air pipe, 180.

Next, the structure of the sedimentation chamber 126 in the treatment tank 112 will be described. The upper part of the sedimentation chamber 126 is cylindrical and the lower part is conical. A sedimentation chamber side exit 158A of a washing waste water pipe 158 is positioned along the internal side wall of the conical portion of the sedimentation chamber 126. Thus, the washing waste water that flows to the sedimentation chamber 126 from the washing waste water pipe 158 forms a circular flow. An extracting pipe 182 runs through the lower inner side wall of the sedimentation chamber 126, and connects with the sludge treatment system (not shown) through an extracting valve 184 and an extracting pump 186.

The upper space of the filtration chamber 120 is linked with the upper space of the sedimentation chamber 126 through air vent pipe 188, so that there is no air pressure gap between filtration chamber 120 and sedimentation chamber 126.

Next, a description will be given of the operation in the sewage treatment tank 110 according to the third embodiment of the invention.

First, the filtration operation will be described. The filtration operation starts with closing of the washing waste water valve 156 and opening of a telescope valve an amount to control the volume of the sewage 116 taken in from the intake opening 144A of the raw water receiving pipe 144. That is, when the telescope valve 146 is opened and the washing waste water valve 156 is closed, the raw water storage chamber 130 and the filtration chamber 120 in the storage tank 128 are linked by a U-shaped pipe through the raw water receiving pipe 144, the flocculating pipe 142, and the transfer water pipe 148. Further, the level of the water surface 138 of the U-shaped pipe in the side of the raw water storage chamber 130 is arranged to be higher than the water surface 140 in the side of the filtration chamber 120. With this arrangement, the water head difference causes the sewage 116 stored in the raw water storage tank 130 to flow into the flocculating pipe 142 through the intake opening 144A of the receiving pipe 144. The sewage 116 flows downward in the flocculating pipe 142 and flows into the filtration chamber 120 through the transfer water pipe 148 from the bottom of the filtration chamber 120. The sewage 116 that flows into the filtration chamber 120 flows upward through the straightening plate 168 and then passes through the floating filter medium layer 118 to overflow into the trough 164. The sewage treatment system 110 of this invention needs no power source since the upward flow is generated in the filtration chamber 120 by supplying the sewage 116 into the filtration chamber 120. Therefore, energy can be saved. The baffling plates 154 are installed in the flocculating pipe 142 and the sewage 116 flows circularly down in the flocculating pipe 142 while passing through the flocculating pipe 142. Therefore, the solid components 124 in the sewage 116 are flocculated before entering the filtration chamber 120. Consequently, the solid components 124 in the sewage 116 can be captured easily by the filter medium 119 when the sewage 116 is filtered by the floating filter medium layer 118.

As the filtration operation is continued, the solid components 124 in the sewage 116 adhering to the filter medium 119 increase. The filter media washing operation is performed when filtration performance is decreased. First, the telescope valve 146 shields the intake opening 144A of the raw water receiving pipe 144 to prevent the sewage 116 from flowing into the intake opening 144A. Next, the washing waste water valve 156 is opened to connect the filtration chamber 120 and the sedimentation chamber 126 to lower the water level of filtration chamber 120. When the level in the filtration chamber 120 is lowered, the washing waste water valve 156 is closed. The reason for lowering the water level in the filtration chamber 120 is to prevent the solid components 124, which are scraped off from the filter medium 119 during the washing process of the filter medium 119, from overflowing into the trough 164. Then, the air nozzles 178A and 178F are opened and closed alternately from time to time to generate air bubbles to the sewage 116 in the filtration chamber 120, as well as to generate circular flows and the like to scrape off the solid contents 124 that are adhered to filter medium 119 from the filter medium 119. When the scraping off of solid components 124 from the filter medium 119 is completed, the air nozzle valve of 178A is closed and the air nozzle 178F is opened, and the washing waste water valve 156 is opened while the floating filter media layer 118 is jetted unidirectionally. Then the washing waste water 122 used for washing the filter medium 119 is sent to the sedimentation chamber 126 via the water pipe 148 and the washing waste water pipe 158. At this time, the sedimentation chamber side 158A of the washing waste water pipe 158 is installed along the inner side wall of the conical portion of the sedimentation chamber 120 so that washing waste water 122 that flows from the washing waste water pipe 158 to the sedimentation chamber 126 becomes a circular flow. With this arrangement, the centrifugal force is applied to the solid components 124 in the washing waste water 122 so that the solid components 124 in the washing waste water 122 circulate along the wall of the conical portion. Therefore, by merely standing for a short period in the sedimentation chamber 126, the solid components 124 in the washing waste water 122, can be accumulated as sediment and separated, so that the treatment of the washing waste water 122 can be accomplished more quickly. After complete transfer of the washing waste water 122 to the sedimentation chamber 126 is performed, the washing waste water valve 156 is closed, and the telescope valve 146 is opened to resume the filtration operation. Then, the washing waste water 122 of the sedimentation chamber 126 stands for a specified time during the filtration process, and the solid components 124 in the washing waste water 122 accumulate as sediment. When the sedimentation and separation of the solid components 124 in the washing waste water 122 are complete, the outflow valve 184 of the outflow pipe 182 is opened to start the exhaust pump 186, and the sedimented solid components 124 are sent to the sludge treatment process. When the sedimented sludge is taken out completely, a switching valve (not shown) of the outflow pipe 182 is switched and the supernatant liquid is sent to the next process.

Thus, the sewage treatment system 110 according to the third embodiment of the present invention transfers the sewage 116 from the raw water storage chamber 130 to the filtration chamber 120 by the water head difference between the raw water storage chamber 130 and the filtration chamber tank 120, and generates upward flows in the filtration chamber 120 to filter through the floating filter medium layer 118. Thus, a power source to supply the sewage 116 to the filtration chamber 120 is not required, so that energy can be saved.

The filtration chamber 120 and the sedimentation chamber 126 are integrated into one unit vertically, and the several air nozzles 174 are installed at the lower part of the floating filter medium layer 118, so that when the filter media 119 are contaminated, the sewage 116 is circulated or air bubbles are generated in the sewage 116 to remove the solid components 124 adhered to filter media 119, and the washing waste water 122 containing the removed solid components 124 is sent to the sedimentation chamber 126 to be separated. Therefore, the washing operation of the filter medium 119 can be simplified and the volume of the washing waste water 122 can be greatly decreased compared to the conventional sewage treatment system wherein the filter medium 119 are moved to the filter recycling device and cleaned with the cleaning water.

In the sewage treatment plant 110 according to the third embodiment of the invention, the volume of the washing waste water 122 is small and just about the same as the capacity of the filtration chamber 120. Therefore, the treatment tank 112 can be integrated by combining the filtration chamber 120 and the sedimentation chamber 126 in a single vertical unit. Thus, the sewage treatment plant 110 according to the third embodiment of the invention offers both the filtration capability of the sewage 116 and the treatment capability of the washing waste water 122. Therefore, the sewage treatment system can be made compact, compared with the conventional sewage treatment system wherein the filtration function and the washing waste water treatment function are separated. By placing the sedimentation chamber 126 under the filtration chamber 120., potential energy is created that can be used to move the washing waste water 122 to the sedimentation chamber 126 without a power source being required. Therefore, the sewage treatment plant 110 according to the third embodiment of invention requires no power source to feed the sewage 116 to the filtration chamber 120 or to move the washing waste water 122 from the filtration chamber 120 to the sedimentation chamber 126. Therefore, a lot of energy can be saved.

Figure 15:
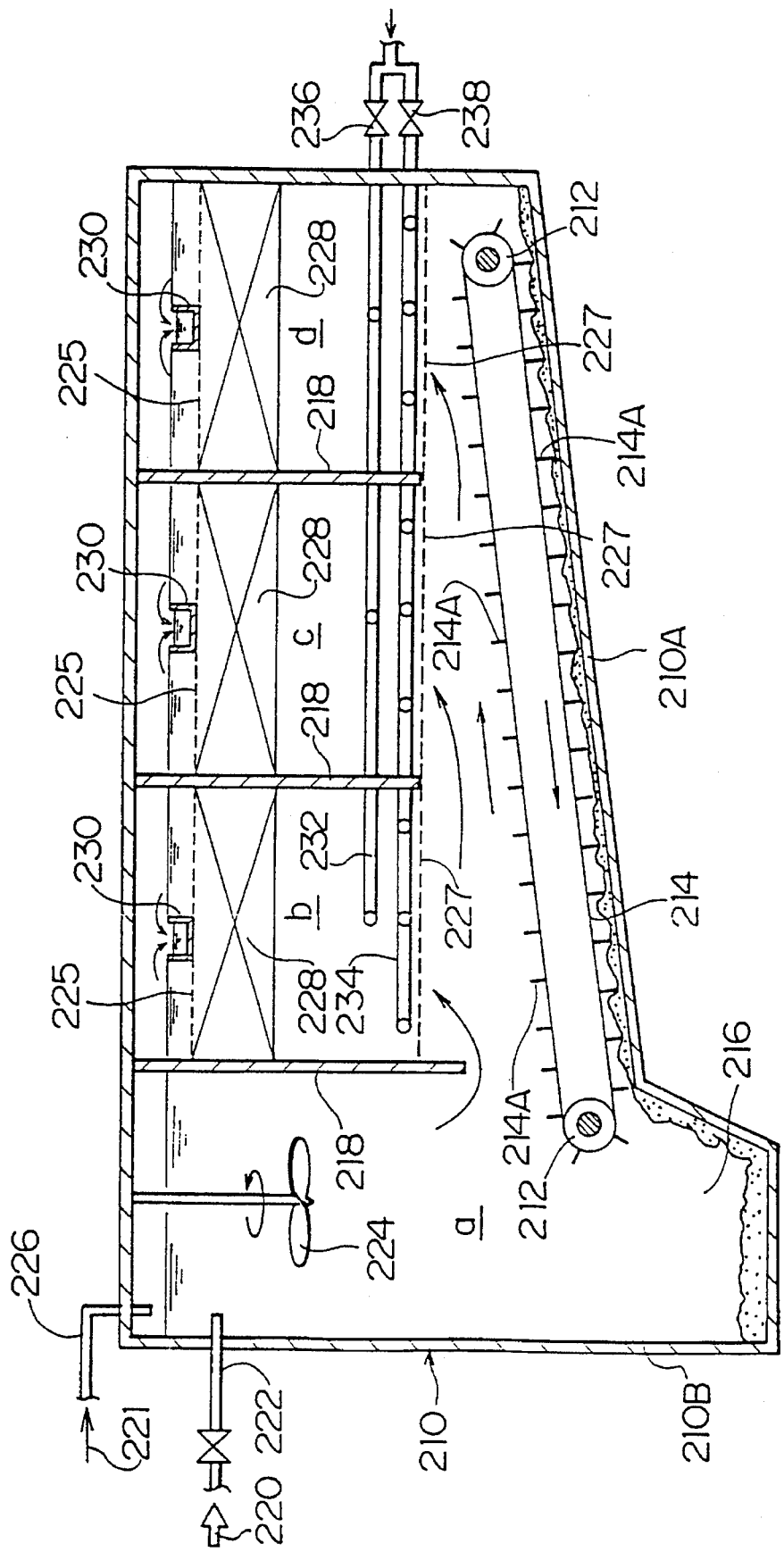
FIG. 15 is a longitudinal sectional view of the fourth embodiment of the sewage treatment system according to the invention.

Next, a description will be given of the sewage treatment system according to the fourth embodiment invention with reference to FIG. 15. The fourth embodiment relates to a sewage treatment system in which the sedimentation separation process causes solid components having proper sedimentary properties to settle as sediment for separation, and also includes high rate filtration by a floating filter medium layer. As shown in FIG. 15, the bottom 210A of the treatment tank 210 is slanted and a caterpillar belt 214 with a rake 214A is hung on pulleys 212 on both ends of the slanted bottom 210A. A sludge storage tank 216 is provided on the lower side of the tilted bottom 210A for collecting the sludge scraped by the caterpillar belt 214 with the rake. Partition walls 218 are located in the treatment tank 210 for dividing the treatment tank 210 into, for example, four areas a, b, c and d, vertically, and the partition wall 218 divides from the top of the treatment tank 210 to about the vertical midway point thereof. A raw water pipe 222 into which the sewage 220 flows is provided through the side wall 210B of the sludge storage tank 216 in the treatment tank 210. A stirrer 224 is located in the area a, situated closest to the raw water pipe 222 into which the sewage 220 flows, among the areas a, b, c and d, a coagulation pipe 226 for adding the coagulant 221 is arranged. In the remaining areas b, c and d, there is a floating filter media layer 228 with the same structure as the first embodiment, consisting of numerous filter media which float under the upper screen 225. The sewage which inflows to the treatment tank 210 is filtered, and a trough 230 is provided at each liquid surface into which filtered water filtered by the floating filter medium layer 228 overflows. Under the floating filter medium layer 228 in each area b, c and d, is an air pipe 232 for generating circular flows, and an air pipe 234 for jetting air unidirectionally. The respective pipes 232 and 234 are connected with a compressor (not shown) through the circular flow valve 236 and the unidirectional jetting valve 238. Under the pipes 232 and 234, there is a lower screen 227 to prevent escape of the filter medium from the areas b, c and d.

In the sewage treatment system of such construction, the sewage which flows to the area a of the treatment tank 210 from the raw water pipe 222 includes a predetermined amount of coagulant added through the coagulation pipe 226, and stirred by the stirrer 224. Thus, the solid components in the sewage are flocculated and flow into the areas b, c and d with floating filter medium layers 228. At this time, a part of the flocculated solid components settles on the bottom 210A of the treatment tank 210, and is scraped by the caterpillar belt 214 with the rake and collected into the sludge storage tank 216. Unsettled solid components are filtered by the floating filter medium layer 228. Such a process lessens the filtration load of the floating filter medium layer 228 by reducing the concentration of solid components in the sewage which pass through the floating filter medium layer 228. As a result, the filtration capacity of the floating filter medium layer 228 can be maintained for a long time, and washing frequency by the air pipe 232 for circular flow and the air pipe 234 for unidirectional jetting can be reduced. When the filtration capacity declines, air is jetted from the air pipe 232 for circular flow and the air pipe 234 for unidirectional jetting to wash filter media, and the solid components scaled off from the filter media and settled are scraped by the caterpillar belt 214 with the rake and collected in the sludge storage tank 216.

Figure 16:
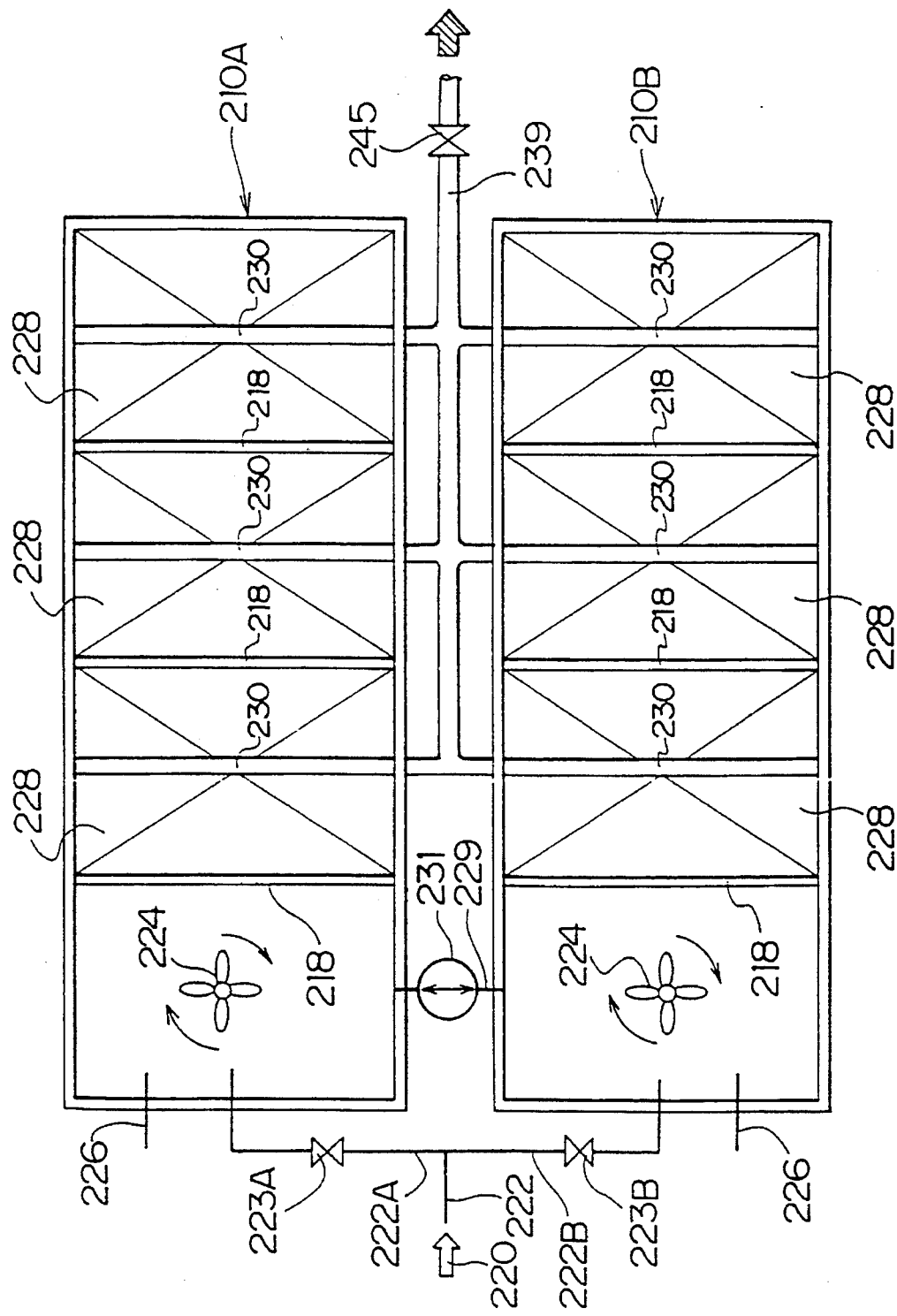
FIG. 16 is a plan view shown from the top of the fifth embodiment of the sewage treatment system according to the invention.
Figure 17:
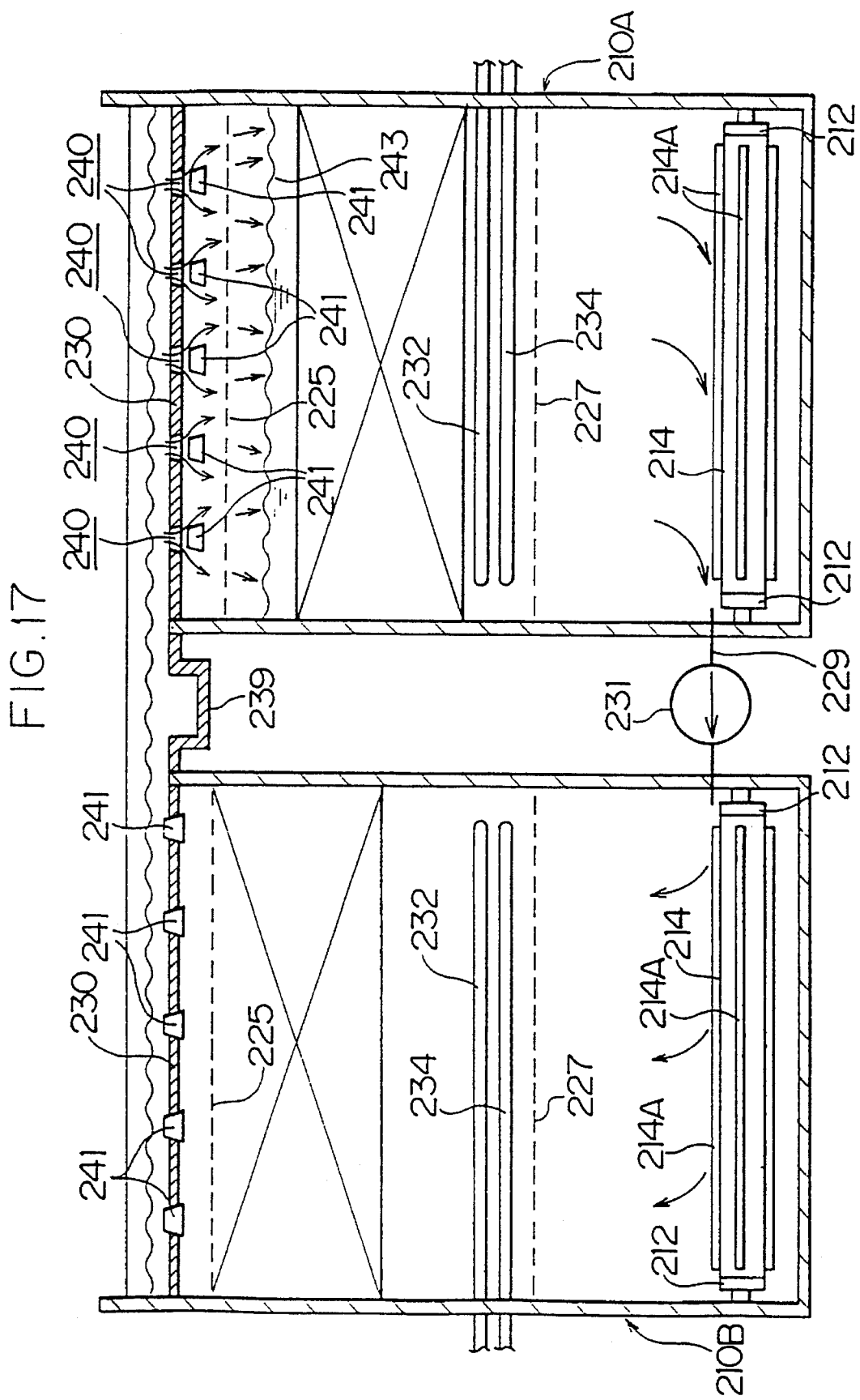
FIG. 17 is a longitudinal sectional view of the fifth embodiment of the sewage treatment system according to the invention.
Figure 18:
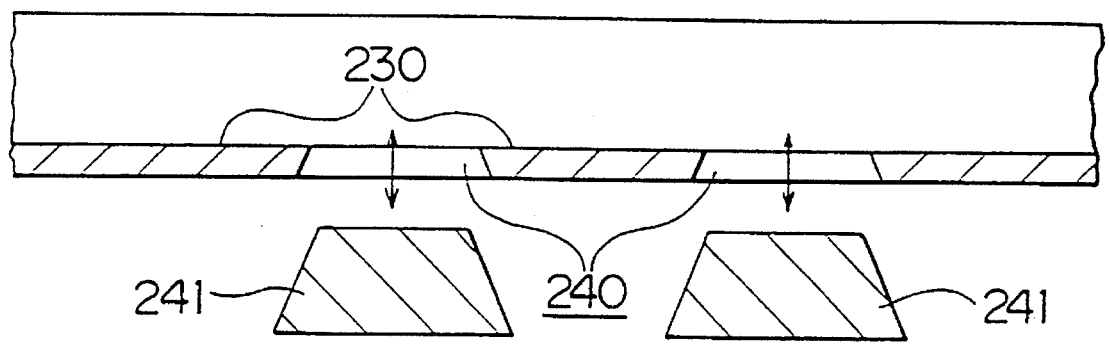
FIG. 18 is a sectional view of the underdrain of the fifth embodiment of the sewage treatment system according to the invention.

Next, a description will be given of the fifth embodiment of the sewage treatment system according to this invention with references to FIGS. 16, 17 and 18. Parts and apparatus which are common with the fourth embodiment are referenced with the same reference numeral. With reference to FIG. 16, the upper side of the sewage treatment system includes a first tank 210A, and the lower side of the sewage treatment system includes a second tank 210B. FIG. 17 shows on the right left cross-sectional view of the first tank 210A and the second tank 210B, respectively.

As shown in FIG. 16, in the fifth embodiment, the sewage treatment systems of the fourth embodiment are linked in parallel. Namely, the raw water pipe 222 is situated in the middle, the first raw water pipe 222A is installed in the first tank 210A, and the second raw water pipe 222B is installed in the second tank 210B. In the first raw water pipe 222A and the second raw water pipe 222B, a first raw water valve 223A and a second raw water valve 223B are respectively installed. The first tank 210A and the second tank 210B are linked by the connecting pipe 229, and a reversible pump 231 (which pumps from the first tank to the second tank and vice versa) with the connecting pipe 229 is provided. The connecting pipe 229 has a coagulant adding opening (not shown). The trough 230 located on the upper side of each floating filter medium layer 228 is connected with the water receiving trough 239, and the water receiving trough 239 has a water release control valve 245. On the bottom of the trough 230, there are several round openings 240 as illustrated in FIG. 18, and the openings 240 are opened and shut by the conical plugs 241 as appropriate. An explanation of a switching mechanism for the plugs is not necessary to understand the invention and is omitted herein.

The operation of the sewage treatment system is described in the following. First, the first inflow valve 223A is shut and the reversible pump 231 is started to pump water from the first tank 210A to the second tank 210B, and the water surface 243 in the first tank 210A is lowered below the upper screen 225. During such operation, the release control valve 245 in the water receiving trough 239 is closed, and plugs 241 are removed from the water receiving trough's 239 opening 240. As a result, the filtered water filtered by the floating filter media layer 228 in the second tank 210B flows to the trough 230 of the second tank 210B, the water receiving trough 239, the trough 230 of the first tank 210A, and then flows into the first tank 210A through the openings 240. Therefore, the filter medium can be washed with clean and fresh filtered water, whereby the cleaning efficiency can be improved. At this time, the opening of the release water control valve 245 is controlled in accordance with the water volume transferred by the reversible pump 231, whereby the water surface level 243 in the first tank 210A can be varied. Thereby, the filtered water passing through the openings 240 of the water receiving trough 239 may be used for showering the filter medium. Subsequently, the filtered water which has been filtered by the floating filter medium layer 228 in the second tank 210B can be used to wash the floating filter medium layer 228 in the first tank 210B. Furthermore, the washing waste water, which contains a large amount of solid components, may be cleaned again in the second tank 210B. Therefore, the washing efficiency of the filter media is improved, and the operation without washing waste water can be performed.

For washing the filter media, air is jetted to the floating filter medium layer 228 en masse by the air pipe 234 for unidirectional jetting, in addition to generating circular flow by the air pipe 232.

While the filter media are washed in the first tank 210A, the high rate filtration through the floating filter medium layer 228 and the sedimentation to the bottom of the tank 210B are performed. At this time, as the first inflow valve 223A of the first tank 210A is shut, the inflow volume of the sewage 220 into the second tank 210B doubles (the sewage 220 which into the first tank 210A flows into the second tank 210B). Therefore, a predetermined amount of coagulant is added through the second tank's 210B coagulation pipe 226, and the coagulant is transferred in the connecting pipe 229. Consequently, the high rate filtration of the sewage 220 by the floating filter media 228 and the sedimentation to the bottom of the tank 210B are performed while adding coagulant. Therefore, the cleansing capability of the sewage can be improved compared to not using coagulants, to maintain a high quality of filtered water.

After washing of the filter medium in the first tank 210A, the reversible pump 231 is stopped, along with addition of the coagulant through the coagulation pipe 226 and the connecting pipe 229. The openings 240 of the water receiving trough 239 of the first tank 210A are shut with plugs 241, the water release valve 245 is closed, and the first inflow valve 223A is opened. In this way, simultaneous operation of the coagulantless sewage treatment operation in the first tank 210A and the second tank 210B is performed.

Further, cleaning of the filter medium in the second tank 210B is done by reversing the activities in the first tank 210A and the second tank 210B in the above mentioned process.

Thus, according to the fifth embodiment, the filter medium can be washed without lessening the volume of the treated sewage, and no washing waste water is discharged into public waters.

Next, the description will be given of the sixth embodiment of the sewage treatment system according to this invention.

Figure 19:
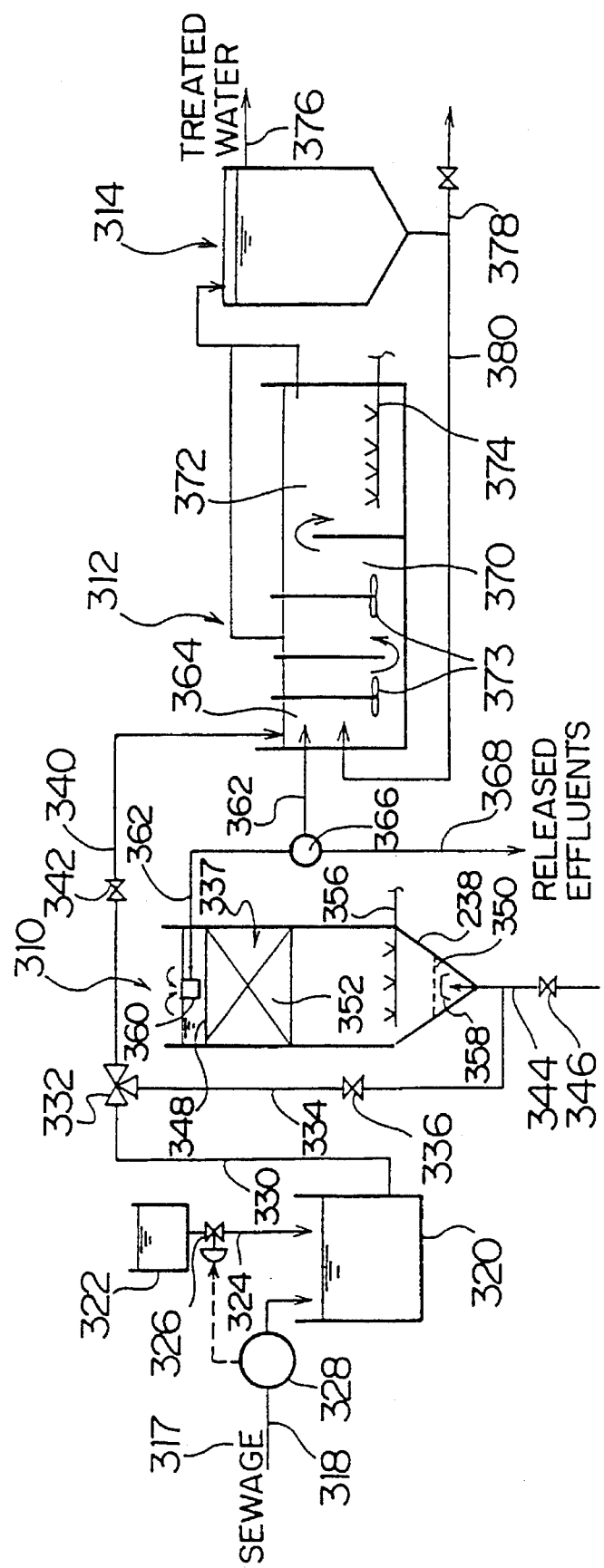
FIG. 19 is a flow diagram of the sixth embodiment of sewage treatment system according to the invention.

FIG. 19 is a diagram of a sewage treatment system according to the sixth embodiment of the invention. In the sewage treatment system according to the sixth embodiment of the invention, the biological treatment is performed after the high speed filtration, and primarily consists of a high speed filtration plant 310, a biological treatment plant 312 and a sedimentation tank 314. FIG. 19 shows only one sewage treatment system to simplify the explanation, but several sewage treatment systems may be installed.

As illustrated in FIG. 19, the sewage flows into the raw water tank 320 through the raw water pipe 318. Near the raw water tank 320, there is a coagulant storage tank 322 to store liquid coagulant. The coagulant in the coagulant tank 322 is added to the raw water tank 320 through the coagulation pipe 324. The control valve 326 provided in the coagulation pipe 324 is connected to the fluid meter 328 of the raw water pipe 318 via a signal cable. The design is such that the additive valve 326 opens when the inflowing sewage volume reaches a certain level to add the predetermined coagulant to the raw water tank 320. Inorganic coagulants such as aluminum sulfate, poly aluminum chloride, and ferric chloride, or polymer coagulants such as anion, nonion, and cation are used as the coagulant. The supply pipe 330 extending from the bottom of the raw water tank 320 is divided into two by the three-way valve 332. One filtration pipe 334 is connected to the bottom of the filtration tank 338 of the high rate filtration plant 310 via a raw water valve 336 and the other, the bypass pipe 340, is connected to the entrance of the biological treatment plant 312 via the bypass valve 342. The raw water valve 336 is kept open during the filtration process, and is kept shut to stop the flow of the sewage to the high rate filtration plant 310 during washing of the floating filter media 337 (discussed later). The bypass valve 342 is opened whenever necessary to allow a part of the raw sewage to flow directly to the biological treatment plant 312. With this arrangement, organic components which are the source of nutrition in the activated sludge added to the biological treatment plant 312 can be kept to a predetermined level.

The filtration pipe 334 passes around the entrance of the filtration tank 338, and is connected with the washing waste water discharge pipe 344 for discharging the washing waste water, which is washed by the filter medium, out of the filtration tank 338. In the washing waste water discharge pipe 344 is a washing waste water discharge valve 346 which is closed during the filtration operation at the high rate filtration plant 310.

The filtration tank 338 of the high rate filtration plant 310 has a square top, and the bottom is formed in a pyramid. At the upper part and the lower part in the filtration tank 338, there is a mesh upper screen 348 and a mesh lower screen 350 across the filtration tank 338. The mesh size of the upper screen 348 should be small enough to block the filter medium, and that of lower screen 350 should be small enough to remove large impurities. Under the upper screen 348, numerous filter media 352 with the same structure as described in the first embodiment are floated and contained to form the floating filter medium layer 337. The ratio of the height of floating filter medium layer 337 height to the height of the filtration tank 338 is also the same as described in the first embodiment. At the lower side of the floating filter medium layer 337, there is an air jet pipe 356 with several jet nozzles near lower screen 350 which eject air in the sewage to generate circular flows to move the filter medium circularly, so as to wash away solid components adhering to filters 352 quickly and efficiently. At the lower part of the filtration tank 338 is a dispersion plate 358 which disperses the sewage, which has entered into the filtration tank 338, throughout the filtration tank 338. Consequently, the sewage, which flows into the lower part of filtration tank 338 from inflow tank 320, is dispersed throughout the filtration tank 338 by the dispersion plate 358, and flows upward in the filtration tank 338. Over the upper screen 348 of the filtration tank 338, there is a trough 360 which receives the overflow of the filtered water filtered by floating filters media 337. The filtered water that overflows into the trough 360 is carried to the anaerobic tank 364 of the biological treatment plant 312 via the biological treatment pipe 362.

The biological treatment pipe 362 is connected to the release pipe 368 via the distribution point 366. The distribution point 366 distributes the volume of filtered water to be supplied to the biological treatment tank 312 and the volume of the filtered water to be supplied to the release pipeline 368 at a fixed ratio so that a part of the filtered water may be released to public waters such as a river directly.

The biological treatment plant 312 consists of an anaerobic tank 364, a denitrification tank 370 and a nitrification tank 372. Activated sludge which contains for example, nitrification bacteria, denitrification bacteria and integrated phosphorus bacteria is added to the anaerobic tank 364, the denitrification tank 370 and the nitrification tank 372. Particularly for the nitrification tank 372, a carrier wrapped in a macropolymer container of about 3 mm size is added, in addition to the above activated sludge. This saves nitrification time. In the anaerobic tank 364 and the denitrification tank 370, there is a stirrer 373, which stirs slowly, whereby the biological treatment reaction is applied to the filtered water that flows from the high rate filtration plant 310 in a anaerobic state. In the nitrification tank 372, there is an aeration device 374, which generates biological treatment reaction in the anaerobic state. Then, the filtered water filtered by the high rate filtration plant 310 flows through the anaerobic tank 364, the denitrification tank 370 and the nitrification tank 372 sequentially, and a constant volume of nitrate liquid is circulated in denitrification tank 370, whereby nitrogen components in the filtered water are removed. By passing filtered liquid through the anaerobic tank 364, the denitrification tank 370 and nitrification tank 372, the activated sludge incorporates organic materials in the anaerobic state (the state without oxygen and oxidized state nitrogen), and phosphorus accumulated in activated sludge is released. At the aerobic state in the nitrification tank 372, the activated sludge reabsorbs phosphorus, and the phosphorous components in filtered water can be removed as absorption becomes more than the released volume at the end.

The water treated in the biological treatment plant 312 flows to the sedimentation tank 314. In the sedimentation tank the activated sludge with the treated water is separated into solids and liquids by sedimentation, and the supernatant of the treated water is released to public waters such as rivers through the treatment water pipe 376. A part of the sedimented activated sludge is sent through the sludge discharge pipe 378 as excess sludge to a sludge treatment process (not shown), and the remaining activated sludge is recycled to the anaerobic tank 364 through the sludge circular pipe 380.

Next, a description will be given of the operation of the sewage treatment system according to the sixth embodiment of invention.

The sewage volume flowing into the raw water tank 320 through the raw water pipe 318 is detected by a flow meter 328 which is placed at the middle of the raw water pipe 318. When the inflowing sewage volume is more than a predetermined value, the additive control valve 326 is opened to add coagulant of a predetermined volume to the raw water tank 320 from the coagulant tank 322. When the flow meter 328 detects the inflow volume under the treatment capacity of the biological treatment plant 312, the flow meter 328 signals the additive control valve 326 to close, whereby the addition of coagulant to sewage is stopped. When the flow meter 328 detects the inflow volume exceeding the treatment capacity of the biological treatment plant 312 the flow meter 328 signals the additive control valve 326 to open, whereby coagulant is added to sewage. The sewage in the inflow tank 320 flows to the bottom of the filtration tank 338 in the high rate filtration plant 310 through the supply pipe 330 and the filtration pipe 334. At this time, the raw water valve 336 is kept open and the bypass valve 342 opens whenever necessary, as described before. The sewage supplied to the filtration tank 338 flows upwardly in the filtration tank 338, and the solid components in the sewage are filtered by the floating filter medium layer 337. The water filtered by the floating filter medium layer 337 overflows into the trough 360, and reaches the aerobic tank 364 of the biological treatment tank 312 through the biological treatment pipe 362 and the distribution point 366. When the volume of the filtered water supplied to the biological treatment plant 312 exceeds the treatment capacity of the biological treatment point 312, the distribution point 366 distributes a part of the filtered water into the release pipe. In the biological treatment plant 312, the filtered water passes through the anaerobic tank 364, the denitrification tank 370 and the nitrification tank 372, so that the nitrogen components, the phosphorus components, and the organic components in the filtered water are removed by the biological treatment reaction. The water treated by the biological treatment plant 312 is sent to the sedimentation tank 314, and then the activated sludge accumulates as sediment and is separated in the sedimentation tank 314 for release into public waters such as a river.

According to the sixth embodiment of the sewage treatment system of the invention, the high rate filtration plant 319 and the biological treatment plant 312 are coordinated to remove the solid components in the sewage by the high rate filtration plant 310 quickly, so that the load placed on the biological treatment plant 312 is lessened. As a result, the quality of the treated water at the exit of the biological treatment plant 312 can be improved, and air to dissolve organic components in the biological treatment plant 312 can be saved to thereby conserve aeration energy, and further, the excess sludge volume can be reduced. As carriers for wrapping nitrate bacteria are added in addition to the activated sludge to the nitrification tank 372 in the biological treatment plant 312, the time for a nitrification reaction can be shortened.

As for the relation between the inflowing volume and the treated water volume, the capacity of the biological treatment plant 312 is twice as much as the inflowing volume under dry weather (no water rising by rain). However, precipitation per day of less than 50 mm, the raw water inflowing volume becomes 2–3 times the treatment capacity, and, when it becomes 50–100 mm, 3–5 times. In the combined sewage lines, when the inflowing sewage volume exceeds the treatment capacity of the biological treatment plant 312 by rising water level in wet weather, the excess sewage must be directly discharged into public waters such as a river, after filtering by the high rate filtration plant 310. As increased sewage by rain in the combined sewage lines must be released into public waters after filtration only, without biological treatment, solid components in sewage thus directly released must be removed as much as possible.

The characteristics of the filter medium 352 structured as described above (the structure has already been explained in the first embodiment in details) are explained with reference to FIGS. 20, 21 and 22 in accordance with the relation of the filtration speed and the catching mechanism of the solid components in the sewage.

Figure 20:
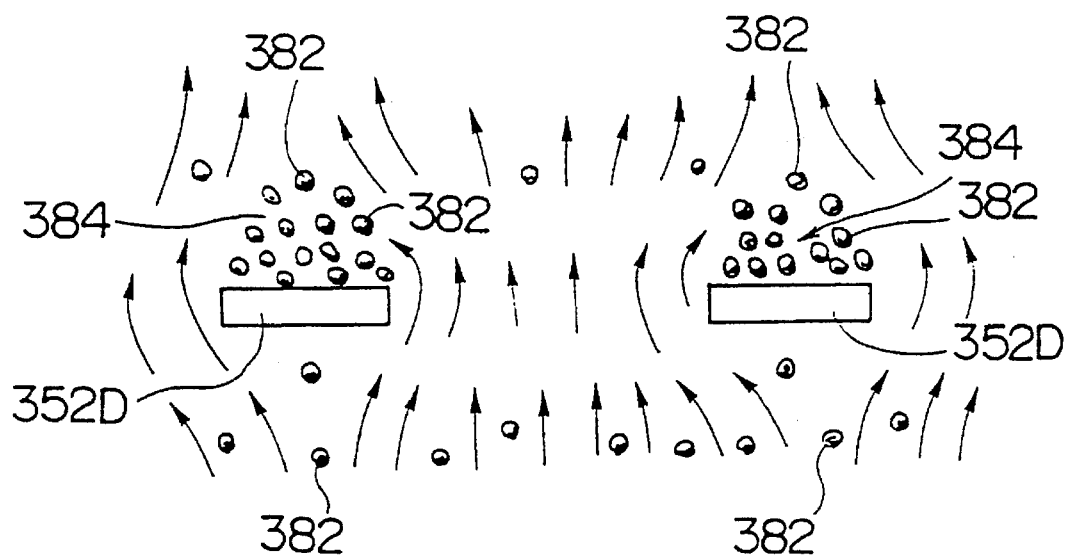
FIG. 20 is a side view of the catching mechanism of the solid components in the sewage without adding additives in the case that the filtration rate of the high rate filtration system is under 400 m/day according to the sixth embodiment.

FIG. 20 illustrates the catching mechanism in which the filtration speed is less than 400 m/day without adding coagulant. The solid components 382 without adding coagulant is small and accumulates as sediment on the filter media 352 and is removed by the catching mechanism formed as a sludge piling layer 384. That is, the contraction flow through the mesh produces a speed difference, whereby circular flows occur. The circular flow generates a local flow stationary area on the upper part of the wire 352D which forms the mesh, and the solid components 382 in the sewage form the sludge pile layer 384 at the local flow stationary area. As the local flow stationary area spreads all over the floating filter media layer 337, solid components 382 are removed at high removal rates.

Figure 21:
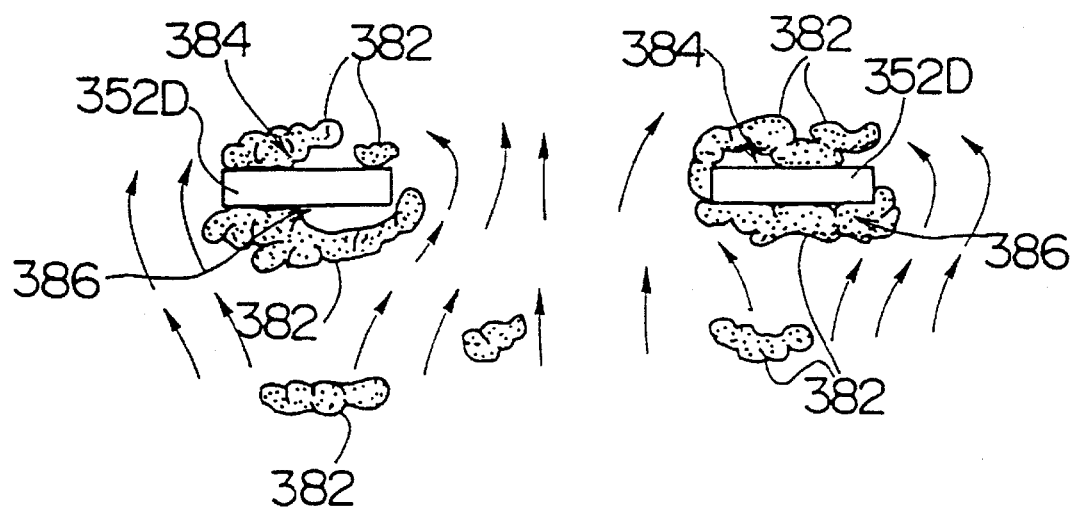
FIG. 21 is a side view of the catching mechanism of the solid components in the sewage with adding additives in the case that the filtration rate of the high rate filtration system is under 400 m/day according to the sixth embodiment.

FIG. 21 illustrates the catching mechanism in which the filtration rate is less than 400 m/day with adding coagulant. The solid components 382 added with coagulant flocculate and accumulate. As the filtration rate is low, both the catching mechanism in which the solid components 382 settle and pile on the filter media 352 to form the sludge pile layer 384, and the catching mechanism in which the solid components 382 collide with the filter medium 352 to form the sludge adhering layer 386 are performed. As both the catching mechanism to form the sludge pile layer 384 and the catching mechanism to form the sludge adhering layer 386 spread all over the floating filter layer 337, the removal rate of the solid components 382 gets even higher.

Figure 22:
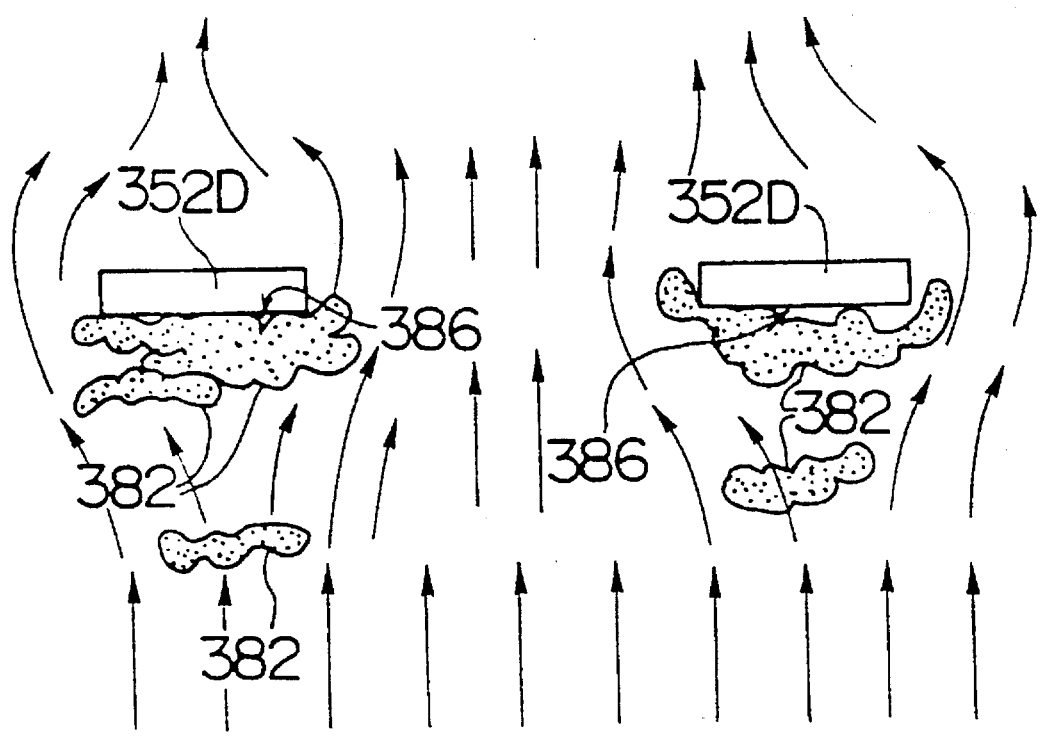
FIG. 22 is a side view of the catching mechanism of the solid components in the sewage with adding additives in the case that the filtration rate of the high rate filtration system is from 400 to 1,000 m/day according to the sixth embodiment; and, FIG. 23 is a flow diagram of the seventh embodiment of sewage treatment system according to the invention.

FIG. 22 illustrates the catching mechanism in which the filtration rate is 400–1,000 m/day with coagulant added. The solid components 382 with added coagulant flocculate and accumulate. As the high rate filtration is performed, the catching mechanism of the solid components 382 to form the sludge pile layer 384 on the upper surface of the filter media 352 dose not operate, but rather only the catching mechanism to form sludge adhering layer 386 operates. As the catching mechanism to form the sludge adhering layer 386 operates throughout the floating filter medium layer 337, the solid components 382 can be removed at a high removal rate. The removal rates of the solid components 382 under the above three different filtration conditions are arranged in the order of decreasing effectiveness with the case that the filtration rate is less than 400 m/day with coagulant added being best, followed by the case that the filtration rate is 400–1,000 m/day with coagulant added being second best, and at last the case that the filtration rate is less than 400 m/day without coagulant added being inferior to the other two cases.

The diameters of the wires 352D which form the mesh screen of the filter media 352 are within 1–5 mm, preferably 2–4 mm, whereby the sludge pile layers 384 and the sludge adhering layer 386 can both be formed effectively. In order to create a stable local stationary flow area at the upper part of the wires 352D, which form the mesh screen of the filter media 352, the diameters of the wires 352D should be more than 1 mm, preferably more than 2 mm. The wires 352D form the sludge adhering layer 386 efficiently by the collision of the enlarged solid components 382 using added coagulants should be somewhat thinner than the solid components 382. Eighty percent of the diameters of the enlarged solid components 382 are 3–5 mm, and the remaining twenty percent are less than 3 mm. Therefore, to remove the solid components 382 with coagulants added, the diameter of the wires 352D forming the filter 352 must be less than 5 mm, preferably less than 4 mm.

According to the invention, by using the above mentioned characteristic of the filter medium 352, in the case that the inflowing sewage volume is below the biological treatment capacity of the biological treatment plant 312, it is preferable that coagulant not be added to the sewage, which is filtered by the high rate filtration plant 310 at the filtration rate less than 400 m/day, and all of the filtered water be sent to the biological treatment plant 312. In case inflowing sewage volume exceeds the biological treatment capacity of the biological treatment plant 312, coagulant is preferably added to the sewage, and filtered by the high rate filtration plant 310 at the filtration rate of 400–1,000 m/day, then, the volume of the filtered water within the treatment capacity is sent to the biological treatment plant 312 through the distribution device 366, and the remaining volume is released into public waters such as a river through the releasing pipe 368. Thus, the removal rate of the solid components in the sewage can be maintained at a high level, and the optimal treatment condition matched to the volume of local and seasonal daily rainfall, without expanding the sewage treatment plant, or the present plant site area, whereby a good water quality standard can be obtained of both treated water after biological treatment by the biological treatment plant 312 and the water released from the high rate filtration plant 310 directly into public waters such as a river.

A description will be given in the following of an example of the treatment method using the sewage treatment system according to this invention compared with the conventional sewage treatment consisting of a primary sedimentation tank and an activated sludge treatment system. In this example, the floating filter medium layer 337 height is 2 m, and the 2 vertical cross-section of the high rate filtration plant 310 is 3 m².

In case the inflowing sewage volume detected by the flow meter 328 is below the treatment capacity of the biological treatment plant 312, coagulant is not added to the raw water tank 320, the sewage is filtered at the filtration rate less than 400 m/day by the high rate filtration plant 310, and the entire volume of which is input to the biological treatment plant 312, for the biological treatment. In this case, the filter medium 352 is washed twice a day.

The removal rate of the solid components at the high rate filtration plant 310 is about 60% as SS (suspended solid), and about 40% as BOD. The quality of the filtered water at the exit of the high rate filtration plant 310 was 60 ppm as SS, and 80–90 ppm as BOD, 25 ppm as ammonium nitrogen, and 3 ppm as phosphorus concentration. The quality of water treated by the biological treatment plant 312, after filtration by the high rate filtration plant 310, is less than 5 ppm as SS, less than 5 ppm as BOD, less than 5 ppm as ammonium nitrogen, and less than 1 ppm as phosphorus concentration. Therefore, the filtration by the high rate filtration plant 310 lessens the load on the biological treatment plant 312, and the biological treatment can be performed very efficiently in the biological treatment plant 312.

In contrast, the removal rate of the solid components in the primary sedimentation tank of the conventional sewage treatment system is about 40% as SS, and about 30% as BOD.

Also, the staying time of the sewage in the filtration tank 338 of the high rate filtration plant 310 at the filtration rate less than 400 m/day is about 15 minutes. However, the conventional primary sedimentation tank required 2 hours of the staying time. Therefore, this invention can shorten the filtration time to ⅛ of the conventional method, to further improve the quality of the filtered water. This implies that the high rate filtration plant 310 reduces the plant site area to ⅛ of the primary sedimentation tank.

The case will now be explained when the inflowing volume detected by the flow meter 328 is twice the treatment capacity of the biological treatment tank 312. 1.0–2.0 mg/l of a cation type polymeric coagulant is added to the sewage in the raw water tank 320, the treatment in the high speed filtration plant 310 is at the filtration rate of 600 m/day, and filtered water flow exceeding the treatment capacity of the biological treatment plant 312 passes to the releasing pipe 368 through the distributor 366 for release directly into public waters. In this case, the filter medium 352 is washed three times a day.

In this case, the removal rate of the solid components 382 by the high rate filtration plant 310 was 85–90% as SS, and about 60% as BOD. The quality of the filtered water at the exit of the high rate filtration plant 310 was 40–50 ppm as SS, 55–65 ppm as BOD, 25 ppm as ammonium nitrogen, and 3 ppm as phosphorus concentration. In this case, nitrogen concentration shortage occurs due to the BOD concentration at the entrance of the biological treatment plant 312. Thus, a part of the sewage is supplied into the anaerobic tank 364 of the biological treatment plant 312 via the bypass pipe 340, by opening the bypass valve 342 for a predetermined value, whereby the BOD concentration is adjusted to 80–90 ppm.

The case will be now explained when the inflowing volume detected by the flow meter 328 is three times as much the treatment capacity of the biological treatment tank 312. 1.0 to 2.0 mg/l of cation type polymeric coagulant is added to the sewage in the raw water tank 320. The treatment in the high speed filtration plant 310 is at the filtration speed 900 m/day, and filtered water flow exceeding the treatment capacity of the biological treatment plant 312 passes to the releasing pipe 368 through the distributor 366 for release directly into public waters. In this case, the filter medium 352 is washed six times a day.

In this case, the removal rate of the solid components 382 by the high rate filtration plant 310 was 80% as SS, and about 50% as BOD. The quality of the filtered water at the exit of the high rate filtration plant 310 was 45–55 ppm as SS, 60–75 ppm as BOD, 25 ppm as ammonium nitrogen, and 3 ppm as phosphorus concentration. The quality of the filtered water, which is treated biologically after filtration by the high speed filtration plant 310 was less than 5 ppm as SS, less than 5 ppm as BOD, less than 5 ppm as ammonium nitrogen, and less than, 1 ppm as phosphorus concentration.

The amount of time the sewage stayed in the filtration tank 338 of the high rate filtration plant 310 at the filtration speed 900 m/day was about 6 minutes. Thus, the amount time can be shortened to 1/20 of the conventional amount of time (2 hours), and the quality of the filtered water can be improved. In this case, the BOD concentration due to nitrogen concentration at the entrance of the biological treatment plant 212 falls short. Therefore, a part of the sewage is supplied to the anaerobic tank 364 of biological treatment plant 312 through the bypass pipe 340 by opening the bypass valve 342 for what is required, to adjust the BOD concentration to 80–90 ppm.

Thus, according to the sewage treatment system of the invention, the filtration condition in the high rate filtration system and the optimum treatment condition such as a released volume into public waters can be chosen so as to match the volume and quality of the inflowing sewage. Even in the case that the inflowing sewage exceeds the treatment capacity of the biological treatment plant 312, the load on the biological treatment plant 312 is lessened to thereby maintain the efficient biological treatment and the water which is only filtered in the high filtration plant 310 can be released with a high quality into public waters such as rivers. The sewage treatment system according to the invention is particularly suited to combined sewage lines. It is effective not only when the inflowing sewage volume is within the treatment capacity of the biological treatment plant 312 in fair weather but also when the inflowing water volume exceeds the treatment capacity of the biological treatment plant 312 by the temporary increase of the inflowing water in wet weather. When coagulant is added and the filtration speed is set less than 400 m/day, the solid components 382 can be removed by the catching mechanism for forming of the sludge pile layer 384 and the sludge adhering layer 386, whereby a very high removal rate can be obtained. When adding coagulant to sewage, a part of the sewage is supplied to the entrance of the biological treatment plant 312 through the bypass pipe 340 to maintain the appropriate concentration of heterotrophy for microbes, whereby nutritive salts such as nitrogen components and phosphoric components are removed to prevent eutrophication.

Therefore, although the inflowing sewage volume exceeds the treatment capacity of the biological treatment plant 312, and only the water is filtered by the high speed filtration system, adequate water quality is obtained by adding appropriate coagulant and selecting an appropriate filtration rate in the high rate filtration plant 310, whereby part of the filtered water can be released into public waters bypassing the biological treatment plant 312 without degrading the public waters such as rivers.

Figure 23:
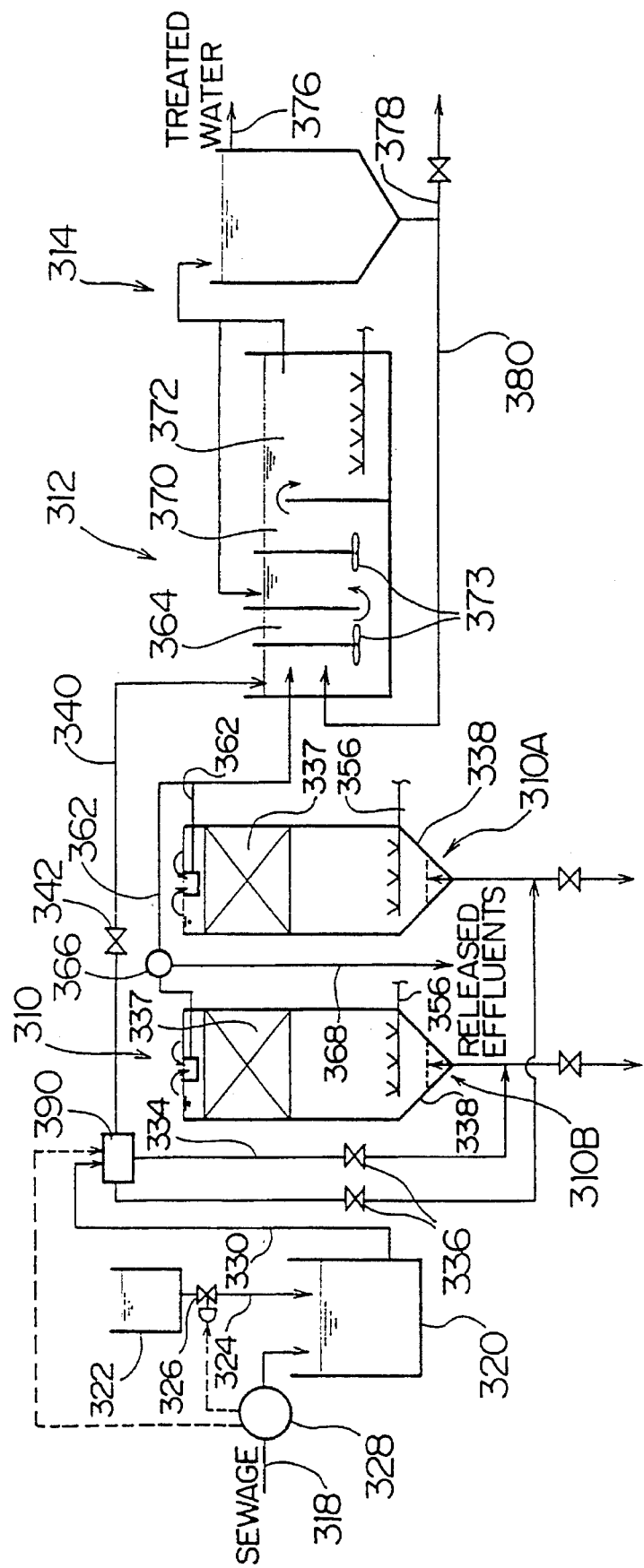

The description will be given of the seventh embodiment of the sewage treatment system according this invention with FIG. 23.

The high rate filtration plant 310 is provided in with two parallel series (A and B). The high rate filtration plants 310A and 310B are switched according to the inflowing sewage volume detected by the flow meter 328. As illustrated in FIG. 23, the sewage flows into the raw water sewage tank 320 from the raw water pipe 318 through flow meter 328, and from the raw water tank 320 to the sewage distributor 390. The sewage distributor 390 distributes the sewage to the two high rate distribution plants 310A or 310B according to signals based on the inflowing sewage volume reported by flow meter 328. The distributor 366 of the B biological treatment pipe 362 may pass the filtered water of B to the A biological treatment pipe 362, or release it directly Into public waters such as rivers through the releasing pipe 368.

The supply of the sewage to the anaerobic tank 364 of the biological treatment plant 312 through the bypass pipe 340 is the same as the fifth embodiment.

The operation of the seventh embodiment will be explained in the following.

(1) When the inflowing sewage volume is about half (½Q) of the biological treatment plant's treatment capacity (1Q), all sewage is passed to high rate filtration plant 310A of A, and treated at the filtration rate less than 400 m/day without adding coagulant, and all filtered water is sent to the biological treatment plant 312 for the biological treatment. At this time, the distributor 366 prevents the filtered water of A from flowing into B.

(2) When the inflowing sewage volume is about the same (1Q) as the treatment capacity of the biological treatment plant 312, both the A and B high rate filtration plants 310A and 310B are used to filter at the filtration speed less than 400 m/day without adding coagulant, and all filtered water in the A and B plants are sent to the biological treatment plant 312 through the distributor 366 for the biological treatment.

(3) When the inflowing sewage amount is about 1.5 (1.5Q) times the treatment capacity of the biological treatment plant 312, the distributor 366 disconnects the link between the biological treatment pipes 362 of A and B, and sends the filtered water which is filtered in the A high rate filtration plant 310A into the biological treatment plant 312, and releases the filtered water by the B high rate filtration plant 310B directly into public waters through the releasing pipe 368. Then coagulant is added to the inflowing sewage in the raw water tank 320, and the waste water amount (1Q) equivalent to the treatment capacity of the biological treatment tank 312 passes to the A high rate filtration plant 310A for treatment at the filtration rate less than 800 m/day prior to being sent to the biological treatment plant 312. The remaining waste water (0.5Q), which is added with coagulant in the raw water tank 320, passes to the B high rate filtration plant 310B through the sewage distributor 390, is treated at the filtration rate of less than 400 m/day, and is released to public waters through the releasing pipe 368. By thus switching the high rate filtration plants 310A and 310B, the filtration condition of the high filtration system (B) is set such that the removal rate of the solid components in the sewage to be released is high, whereby the quality of the water to be released can be improved. In this case, the high removal rate of the solid components by the B high rate filtration plant 310B can reach 95%.

(4) When the inflowing sewage volume about doubles (2Q) to exceed the treatment capacity of the biological treatment plant 312, the distributor 366 disconnects the link between the A and B series of the biological treatment pipe 362, and the water filtered by the A series high rate filtration plant 310A passes to the biological treatment plant 312 and the water filtered by the B series high rate filtration plant 310B passes directly into public waters through the releasing pipe 368. In this case, the coagulant is added to the inflowing sewage in the raw water tank 320 and the waste water volume (1Q) equivalent to the treatment capacity of the biological treatment plant 312 (1Q) is sent by the sewage distributor 390 to the A series high rate filtration plant 310A and treated at the filtration speed 800–1,000 m/day, and is then sent to the biological treatment plant 312. The remaining sewage (1Q), to which coagulant was added, is sent to the B series high rate filtration plant 310B, and treated at the filtration rate of 800–1,000 m/day, and then released to public waters through the releasing pipe 368.

Thus, according to the seventh embodiment of this invention, two high rate filtration plants 310 are provided. Therefore, different filtration conditions can be set to deal with variable volumes of inflowing sewage to prevent degradation of waste water discharged into public waters such as rivers. Particularly, in high-rain areas, when the solid components in the sewage increase suddenly when the rain starts, the above operation (3) is applied, whereby the filtration speed of the B series high rate filtration plant 310B is lowered to increase the removal rate of the solid components 382. Some time after the rain begins, the inflowing volume continues to increase but solid components 382 and BOD concentration fall drastically. In this case, though the operation is switched from (3) to (4), there is little decline of the quality of the released waste water to affect the natural environment.

The method of washing the filter medium 352 in the sixth and seventh embodiments are the same as the first embodiment. Therefore, no separate explanation is necessary herewith.

As described above, in the sewage treatment plant according to the invention, the sewage which flows upward into the treatment tank is filtered by the floating filter media layer which is formed by the filter medium consisting of numerous cylindrical filter media with open upper and lower ends and mesh sides and having a void rate more than 80%. Therefore, the filtration capacity to filter the solid components in the sewage can be improved. The circular flow is generated in the sewage to scrape off the solid components adhering to the filter medium, and the sewage containing the solid components which is scraped off by jetting the filter media layer as a whole are discharged from the tank. Therefore the washing capacity can be improved. Partitions vertically separate the treatment tank at predetermined width/height ratios of the floating filter medium layer, and the air jetting means generate circular flows in each area of the treatment tank separated by the partitions, whereby the solid components adhering to filter medium can be washed and scaled off efficiently within a short time. The washing capacity can be improved significantly when the width/height ratio is 0.3–1.6, preferably 0.7–1.2. by proper placement of the partitions.

A guide passage guides the circular flow vertically in each area. Therefore, only a little air can generate a circular flow to thereby save power to generate air, and operation cost can be reduced.

In the sewage treatment system according to a first aspect of the invention, even a large treatment tank using floating filter media is capable of washing filters within a short time and efficiently, so that the solid/liquid separating system saves power to provide a low running cost.

The sewage treatment plant according to a second aspect of the invention supplies the sewage from the storage tank to the filtration plant by a water head difference caused by water level differences between the storage tank and the filtration plant, and generates circular flow in the filtration plant to filter through the floating filter medium. The filtration plant and the sedimentation plant are integrated into one unit, and the washing waste water is sent from the filtration plant to the sedimentation plant using potential energy. With this arrangement, no power source to supply sewage to the filtration plant and to send washing waste water from the filtration plant to the sedimentation plant is required, thereby saving energy.

The filtration plant and the sedimentation plant are integrated vertically and an air jetting means is placed at the lower part of the floating filter medium layer to blow air bubbles to scrape off the solid components adhering to the filter medium and to send washing waste water containing scaled off solid contents to the sedimentation plant to accumulate as sediment and to separate them. Thus, the filter medium can be washed more easily, the washing waste water volume can be reduced and the system can become compact, compared to the conventional sewage treatment system in which filter media are moved to the filter medium recycling plant to be washed with fresh water and the fresh water flows downward opposite to the sewage.

The sewage treatment system according to a third aspect of the invention coordinates the high rate filtration plant with the biological treatment plant and removes the solid components in the waste water in the high rate filtration plant at a high speed, whereby the load of the biological treatment plant can be reduced. Therefore, the quality of the water after the biological treatment can be improved and the air volume for dissolving heterotrophy in the biological treatment plant can be reduced to thereby save aeration power, and further the generation volume of the excess sludge can be reduced. Further, carriers which wrap nitrification bacteria are added in the nitrification tank of the biological treatment plant, in addition to the activated sludge, so that the time for nitrification reaction can be saved.

The high rate filtration plant makes possible selecting the optimal condition depending upon the volume or the nature of the inflowing sewage, such as filtration condition or the volume to be directly released into public waters. Therefore, when the inflowing sewage exceeds the treatment capacity of the biological treatment plant, the load of the biological plant can be reduced and the effective biological treatment can be performed, and only the excess inflowing sewage is filtered by the high rate filtration plant, so that high quality waste water can be released. Therefore, particularly in the case of combined sewage lines, when the inflowing sewage is below the treatment capacity of the biological treatment system in fine weather, although the inflowing sewage exceeds temporarily the treatment capacity of the biological treatment plant in wet weather, the sewage can be treated.

In adding coagulant to the sewage, the part of the sewage is supplied into the biological treatment plant through the bypass pipe to maintain the predetermined heterotrophy concentration, and enough nutritious salts such as nitrogen components and phosphorus components are removed to prevent eutrophication.

The sewage treatment plant according to the invention has the advantage in that time for treating the inflowing sewage can be saved sufficiently and the quality of the filtered water can be improved, compared to the conventional sewage treatment system, which combines the primary sedimentation plant and the activated sludge treatment. As a result, the sewage treatment plant according to this invention considerably can expand the treatment capacity per plant site area compared to the conventional sewage treatment plant by being compact.

It should be understood, however, that the invention is not limited to the specific forms disclosed, but on the contrary, the invention covers all modifications, alternate constructions and equivalents falling within the spirit and scope of the invention as expressed in the appended claims.

We claim:

1. A sewage treatment system for applying filtration treatment and biological treatment to sewage, and cleaning the sewage, the sewage treatment system comprising:

a filtration plant for filtering the sewage which flows upwardly in the filtration tank, with a floating filter medium layer formed with numerous floating filter media which have a smaller specific gravity than the sewage, said filtration plant producing filtered water, the floating filter media being cylindrical mesh objects with open ends;

a biological treatment plant arranged for biologically treating with microbes by contacting said microbes with the filtered water filtered through the filtration plant;

a bypass line arranged for allowing the sewage to directly flow into an entrance of the biological treatment plant by bypassing the filtration plant, said bypass line operating to maintain organic concentration in the biological treatment plant at a value which is sufficient to provide a source of nutrition for the microbes;

a releasing line arranged for directly releasing the filtered water, which is filtered by the filtration plant, to public waters without processing through the biological treatment plant;

a coagulant adding means arranged for adding a coagulant to the sewage flowing into the filtration plant when a volume of the sewage flowing into the filtration plant is more than a capacity of the biological treatment plant; and a distributing means for distributing the filtered water from the filtration plant into a first part to be sent to the biological treatment plant and a second part to be directly discharged via the releasing line to the public waters, the distributing means operable for sending all of the filtered water from the filtration plant to the biological treatment plant when the volume of the sewage flowing into the filtration plant is less than the capacity of the biological treatment plant, the distributing means operable for sending the first part of the filtered water from the filtration plant to the biological treatment plant, said first part corresponding to the capacity of the biological treatment plant, and sending the rest of the filtered water to the releasing line when the volume of the sewage flowing into the filtration plant is more than the capacity of the biological treatment plant.

2. A sewage treatment system as set forth in claim 1, wherein the biological treatment plant comprises a nitrification tank and a denitrification tank.

3. A sewage treatment system for applying filtration treatment and biological treatment to sewage, and cleaning the sewage, the sewage treatment system comprising:

two filtration plants for filtering the sewage, in each plant said sewage flowing upwardly in a filtration tank, said tank containing a floating filter medium layer formed with numerous floating filter media which have a smaller specific gravity than the sewage, the floating filter media being formed as cylinder mesh objects with open ends, said flowing producing filtered water, a biological treatment plant arranged for biologically treating with microbes by contacting said microbes with the filtered water;

a bypass line arranged for allowing the sewage to directly flow into an entrance of the biological treatment plant by bypassing the filtration plants so as to maintain organic concentration in the biological treatment plant at a value, said value being sufficient to provide a source of nutrition for the microbes;

a releasing line arranged for directly releasing the filtered water to public waters without processing through the biological treatment plant;

a coagulant adding means for adding a coagulant to the sewage flowing into the filtration plants when a volume of the sewage flowing into the filtration plants is more than a capacity of the biological treatment plant; and a distributing means for distributing the filtered water from the filtration plants into a first part to be sent to the biological treatment plant and a second part to be directly discharged via the releasing line to public waters, such that, when the volume of the sewage flowing into the filtration plants is more than the capacity of the biological treatment plant, the sewage is filtered simultaneously in the two filtration plants after adding the coagulant with the distributing means operable for sending the filtered water filtered by one filtration plant to the biological treatment plant and the distributing means operable for sending the filtered water filtered by the other filtration plant to the releasing line.

* * * * *